(12) United States Patent
Nakamura et al.

(10) Patent No.: US 11,762,272 B2
(45) Date of Patent: Sep. 19, 2023

(54) LIGHT-SOURCE DEVICE AND IMAGE PROJECTION APPARATUS

(71) Applicant: Ricoh Company, Ltd., Tokyo (JP)

(72) Inventors: Kasumi Nakamura, Kanagawa (JP); Yohei Takano, Kanagawa (JP); Makoto Hirakawa, Tokyo (JP); Kazuhiro Fujita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/969,702

(22) Filed: Oct. 20, 2022

(65) Prior Publication Data

US 2023/0043477 A1 Feb. 9, 2023

Related U.S. Application Data

(63) Continuation of application No. 17/109,174, filed on Dec. 2, 2020, now Pat. No. 11,506,967.

(30) Foreign Application Priority Data

Dec. 2, 2019 (JP) .................................. 2019-217928
Oct. 5, 2020 (JP) .................................. 2020-168713

(51) Int. Cl.
*G03B 21/20* (2006.01)
*G03B 33/12* (2006.01)

(52) U.S. Cl.
CPC .......... *G03B 21/208* (2013.01); *G03B 21/204* (2013.01); *G03B 33/12* (2013.01)

(58) Field of Classification Search
None
See application file for complete search history.

(56) References Cited

U.S. PATENT DOCUMENTS

| 2006/0126690 A1* | 6/2006 | Kido | ..................... G02B 6/425 |
| | | | 372/43.01 |
| 2006/0146296 A1* | 7/2006 | Lin | ..................... G03B 21/208 |
| | | | 353/94 |

(Continued)

FOREIGN PATENT DOCUMENTS

| CN | 103869590 | 6/2014 |
| CN | 104820334 | 8/2015 |

(Continued)

OTHER PUBLICATIONS

Chinese Office Action dated Dec. 30, 2021, issued in corresponding Chinese Patent Application No. 202011399418.6.

(Continued)

*Primary Examiner* — Bao-Luan Q Le
*Assistant Examiner* — Danell L Owens
(74) *Attorney, Agent, or Firm* — XSENSUS LLP

(57) ABSTRACT

A light-source device includes an excitation light source; a wavelength conversion unit to convert at least some of first color light into second color light; a light mixing element including a rod integrator to mix at least one of the first color light and the second color light from the conversion unit; and an optical element on an optical path of the first color light and having a reflecting surface. A center of the first color light on the reflecting surface intersects with only one of a first light flux of the first color light incident on and a second light flux of the first color light emitted from the conversion unit. An angle formed by a projection straight line of the first color light incident on an incident aperture of the integrator and a predetermined axial line of the incident aperture of the integrator is smaller than 40°.

20 Claims, 25 Drawing Sheets

(56) References Cited

U.S. PATENT DOCUMENTS

| | | |
|---|---|---|
| 2012/0106178 A1 | 5/2012 | Takahashi et al. |
| 2012/0206900 A1 | 8/2012 | Yang et al. |
| 2014/0078472 A1* | 3/2014 | Masuda .................. F21V 13/08 |
| | | 353/31 |
| 2014/0160441 A1 | 6/2014 | Kim et al. |
| 2015/0267880 A1 | 9/2015 | Hadrath et al. |
| 2016/0344986 A1 | 11/2016 | Hirakawa |
| 2016/0349606 A1 | 12/2016 | Nishimori et al. |
| 2017/0328540 A1 | 11/2017 | Paul et al. |
| 2018/0024425 A1* | 1/2018 | Fujita ..................... G03B 21/16 |
| | | 362/84 |
| 2019/0250491 A1 | 8/2019 | Kawasumi |
| 2020/0064719 A1 | 2/2020 | Nakamura et al. |
| 2020/0301260 A1 | 9/2020 | Takano et al. |
| 2020/0301266 A1 | 9/2020 | Nakamura et al. |

FOREIGN PATENT DOCUMENTS

| | | |
|---|---|---|
| CN | 106226985 | 12/2016 |
| CN | 107111221 | 8/2017 |
| JP | 2011-013320 | 1/2011 |
| JP | 2012-123179 | 6/2012 |
| JP | 2016-99451 | 5/2016 |
| JP | 2018-004676 | 1/2018 |
| JP | 2019-139114 | 8/2019 |
| JP | 2020-086261 | 6/2020 |

OTHER PUBLICATIONS

Office Action issued May 27, 2022 in Chinese Patent Application No. 202011399418.6, 10 pages.

* cited by examiner

TOTAL ENERGY OF LIGHT INCLUDED IN ☐ : A
TOTAL ENERGY OF LIGHT INCLUDED IN ☐ : B

LIGHT-SOURCE DEVICE AND IMAGE PROJECTION APPARATUS

CROSS-REFERENCE TO RELATED APPLICATIONS

This patent application is a continuation of U.S. application Ser. No. 17/109,174, filed Dec. 2, 2020, which is based on and claims priority pursuant to 35 U.S.C. § 119(a) to Japanese Patent Application Nos. 2019-217928, filed on Dec. 2, 2019, and 2020-168713, filed on Oct. 5, 2020, in the Japan Patent Office, the entire disclosure of each of which is hereby incorporated by reference herein.

BACKGROUND

Technical Field

Embodiments of the present disclosure relate to a light-source device and an image projection apparatus.

Related Art

Projectors (image projection apparatuses) that magnify and project various images are widely used. A projector focuses light emitted by a light source onto a spatial light modulation element, such as a digital micromirror device (DMD) or a liquid crystal display element, and displays, as a color image, light modulated in accordance with an image signal and emitted from the spatial light modulation element onto a screen.

A projector in many cases uses, for example, a high-brightness extra-high-pressure mercury lamp in related art. However, the life of such a lamp is short and the maintenance is frequently required. Accordingly, in recent years, projectors using. e.g., a laser source or a light emitting diode (LED) light source instead of an ultra-high pressure mercury lamp have been increasing. This is because a laser source and an LED have longer lives and higher color reproducibility due to monochromaticity compared to an extra-high-pressure mercury lamp.

A projector irradiates an image display element such as a DMD with light of, for example, three colors including red, green, and blue which are primary colors to form an image. All the three colors can be generated by laser sources; however, this is not desirable because a green laser and a red laser have lower emission efficiencies than a blue laser. Thus, there is used a method of irradiating a fluorescent material with a blue laser beam as excitation light to obtain fluorescence (fluorescence light) through wavelength conversion at the fluorescent material and generating red light and green light from the fluorescence.

Since excitation light of several tens of watts (W) is condensed and emitted to the fluorescent material, the efficiency degradation or the changes over time might occur due to burnout or temperature rise. For this reason, the phosphor (fluorescent material) layer is formed on the disk and rotated to prevent the irradiation position of the excitation light from being concentrated on one point. The disc is called a phosphor wheel. In the phosphor wheel, the fluorescent material is formed in a fan shape or a toroidal shape along the periphery of the disk.

As an example of light-source devices with a DMD and a phosphor wheel as described above, there has been proposed a device in which a part of the phosphor wheel is used as a transmission plate so as to simplify the entire light-source device. Further, there has also been proposed a device in which a part of the phosphor wheel is used as a reflector so as to reduce the size of the light-source device, as another example of light-source devices with a DMD and a phosphor wheel as described above.

SUMMARY

According to an aspect of the present disclosure, there is provided a light-source device that includes an excitation light source, a wavelength conversion unit, a light mixing element, and an optical element. The excitation light source emits first color light. The wavelength conversion unit includes a wavelength converting member configured to receive the first color light, convert at least some of the first color light into second color light having a wavelength different from a wavelength of the first color light, and emit the second color light. The light mixing element includes a rod integrator configured to mix at least one of the first color light and the second color light emitted from the wavelength conversion unit. The optical element is disposed on an optical path of the first color light and has a reflecting surface configured to reflect the first color light. A center of the first color light on the reflecting surface of the optical element intersects with only one of a first light flux of the first color light incident on the wavelength conversion unit and a second light flux of the first color light emitted from the wavelength conversion unit. An angle formed by a projection straight line of the first color light incident on an incident aperture of the rod integrator and a predetermined axial line of the incident aperture of the rod integrator is smaller than 40°.

According to another aspect of the present disclosure, there is provided an image projection apparatus, that includes the light source device, an illumination optical system, and a projection optical system. The illumination optical system guides light emitted from the light source device to an image display element. The projection optical system projects an image formed by the image display element, with the light guided by the illumination optical system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
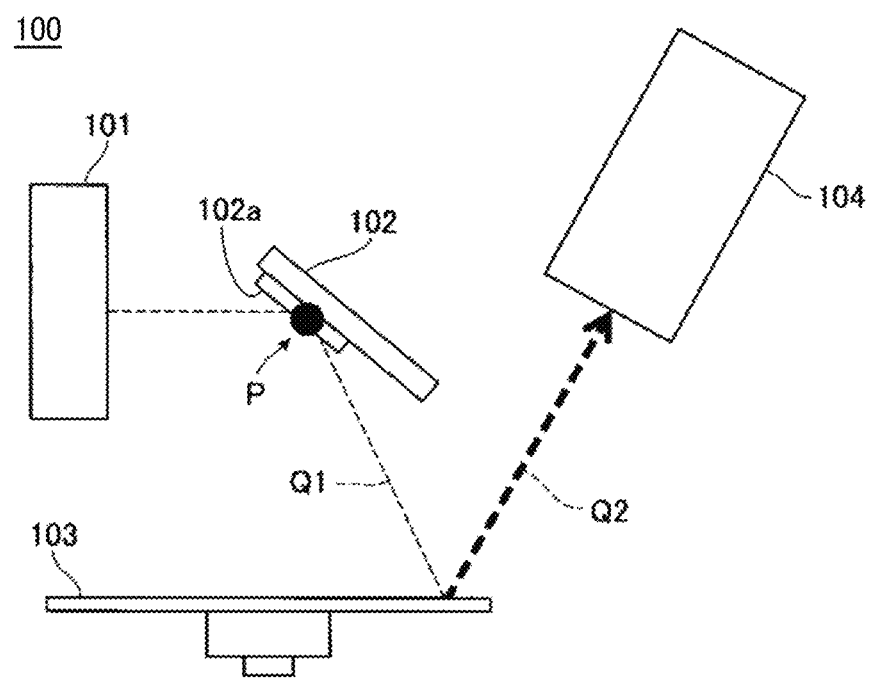
FIGS. 1A and 1B are schematic diagrams of a light-source device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Conventionally, light-source devices are known provided with a DMD and a phosphor wheel whose part is used as a reflector so as to reduce the size of the entire light-source device. In such light-source devices, the excitation light is reflected by the phosphor wheel in the same direction as the fluorescence, and a phase-contrast plate (quarter (¼) wave retarder) and the polarization splitter are arranged on the optical path to prevent the reflected light from returning to the excitation light source.

In the light-source device having such a configuration, the phase-contrast plate (quarter wave retarder) and the polarization splitter are disposed on the optical path of the excitation light. This restricts a reduction in the size of the light-source device and also increases the cost. In addition, the optical path of the excitation light proceeding to the phosphor wheel and the optical path of the excitation light reflected from the phosphor wheel pass through the same position in phase-contrast plate or the polarization splitter. For this reason, the light condensing density on these optical elements might increase, and this might cause damage or the like, thus resulting in a decrease in reliability.

The present inventors have paid attention to the fact that such a configuration of the light-source device hampers the downsizing of the device body and the reduction in cost, and also causes a decrease in reliability. Then, the present inventors have conceived of the embodiments of the present disclosure that achieve a reduction in the size of the device body and the cost and an increase in reliability by preventing the optical path of the excitation light proceeding to the phosphor wheel and the optical path of the excitation light reflected from the phosphor wheel from overlapping with each other in the light-source device.

In other words, embodiments of the present disclosure provide a light-source device including a light source that emits excitation light, an optical element having a reflecting surface that reflects the excitation light emitted from the light source, and a wavelength conversion unit including a wavelength converting member configured to convert at least some of the excitation light into a fluorescence having a wavelength different from a wavelength of the excitation light and emit the converted fluorescence. In the light-source device, a point P is disposed to intersect with one of a light flux Q1 and a light flux Q2 and not intersect with the other of the light flux Q1 and the light flux Q2, where the point P is the center of a projection image of the excitation light projected onto the reflecting surface of the optical element, the light flux Q1 is a light flux of the excitation light incident on the wavelength conversion unit, and the light flux Q2 is a light flux of the excitation light emitted from the wavelength conversion unit. That is, a mode in which the point P intersects with only the light flux Q1 and does not intersect with the light flux Q2 and a mode in which the point P intersects with only the light flux Q2 and does not intersect with the light flux Q1 are possible.

According to embodiments of the present disclosure, the light flux of the excitation light emitted from the wavelength conversion unit does not intersect with the center of the projection image of the excitation light emitted from the light source. Such a configuration prevents these pieces of excitation light from passing through the same location on the optical element, which further prevents damage of the optical element due to an increase in the light condensing density. Thus, the reliability can be increased. Further, particular optical elements such as a phase-contrast plate and a polarization splitter are not used to separate the optical paths of the excitation light from the wavelength conversion unit. This reduces the number of components and the cost for producing the device, thus achieving a reduction in the size of the device.

Figure 1B:
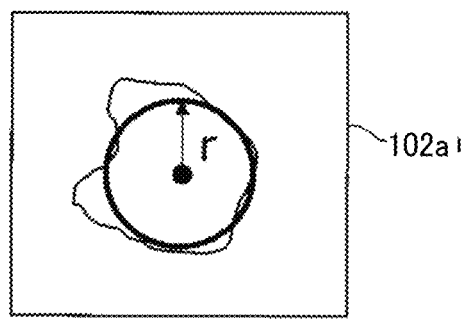

FIGS. 1A and 1B are schematic diagrams of a light-source device 100 according to an embodiment of the present disclosure. FIG. 1A is an illustration of components of the light-source device 100 according to an embodiment. FIG. 1B is an illustration of excitation light projected onto a reflecting surface 102a of a dichroic mirror 102 of the light-source device 100. FIG. 1B indicates the reflecting surface 102a as viewed from the direction of travel of the excitation light from the light source 101.

As illustrated in FIGS. 1A and 1B, the light-source device 100 according to an embodiment includes a light source (an excitation light source) 101, a dichroic mirror 102 constituting an example of an optical element, a phosphor unit 103 constituting an example of a wavelength conversion unit, and a rod integrator 104 constituting an example of a light mixing element.

The configuration of the light-source device 100 according to the present embodiments is not limited to the configuration illustrated in FIG. 1 and can be appropriately changed. For example, the light-source device 100 may be equipped with the light source 101, the dichroic mirror 102, and the phosphor unit 103 only. In the light-source device 100 equipped with the light source 101, the dichroic mirror 102, and the phosphor unit 103, the components other than the light source 101 constitute a light-source optical system.

The light source 101 emits excitation light (first color light or first colored light). The dichroic mirror 102 has a reflecting surface 102a that reflects the excitation light emitted from the light source 101 and guides the excitation light to the phosphor unit 103. The portion of the dichroic mirror 102 other than the reflecting surface 102a may have an optical property that transmits the excitation light emitted from the light source 101 and the fluorescence light emitted from the phosphor unit 103.

The phosphor unit 103 has a first region that reflects or diffusely reflects the excitation light and a second region that converts at least a part of the excitation light into fluorescence (fluorescence light) (second color light or second colored light) having a wavelength different from the wavelength of the excitation light and emits the fluorescence. Once the excitation light is incident on the phosphor unit 103, the phosphor unit 103 alternately emits the excitation light and the fluorescence (fluorescence light) to the incident-plane side (upward in FIG. 1A) on which the excitation light from the light source 101 has been incident, in a sequential manner. The rod integrator 104 is disposed such that the excitation light and the fluorescence emitted from the phosphor unit 103 are directed to and incident on the rod integrator 104. The rod integrator 104 mixes (homogenizes) the incident excitation light and fluorescence to emit the mixed light to the outside of the light-source device 100.

FIG. 1A indicates a case in which the first region of the phosphor unit 103 is provided in the optical path of the excitation light emitted from the light source 101. The excitation light emitted from the light source 101 is reflected by the reflecting surface 102a of the dichroic mirror 102 toward the phosphor unit 103 side. The excitation light reflected by the reflecting surface 102a is reflected by the first region of the phosphor unit 103 toward the incident-plane side on which the reflected excitation light has been incident on the phosphor unit 103. The rod integrator 104 is arranged ahead in the direction of the reflection of the excitation light from the phosphor unit 103.

In the light-source device 100 with the above-described arrangement of the optical path of the excitation light, the center of the excitation light on the reflecting surface 102a of the dichroic mirror 102 is defined as a point P, the light flux of the excitation light incident on the phosphor unit 103 is defined as a light flux Q1, and the light flux of the excitation light emitted from the phosphor unit 103 is defined as a light flux Q2. In the light-source device 100, the dichroic mirror 102, the phosphor unit 103, and the rod integrator 104 are arranged so that the point P intersects with only one of the light flux Q1 and the light flux Q2 and do not intersect with the other of the light flux Q1 and the light flux Q2. To be more specific, in the light-source device 100 of FIG. 1A, the dichroic mirror 102, the phosphor unit 103, and the rod integrator 104 are arranged such that the point P intersects only the light flux Q1 and does not intersect the light flux Q2.

The point P of the excitation light (the center of the projection image of the excitation light projected onto the reflecting surface 102a) is defined as follows: (1) When the light intensity distribution within the projection range of the excitation light projected onto the reflecting surface 102a is line-symmetric or point-symmetric, the center of the minimum circumscribed circle (circumcircle) of the projection range of the excitation light is set as the center of the projection image center. (2) When the light intensity distribution in the projection range of the excitation light projected on the reflecting surface 102a is a pattern other than the line symmetry or the point symmetry (that is, any case other than the case (1) above), the center P is defined as follows: As illustrated in FIG. 1B, when A denotes the total energy of the excitation light projected onto the reflecting surface 102a and B denotes the total energy of light included in any desired circle with a radius r within the projection range, the ratio of B with respect to A (B/A) is greater than or equal to 93% (B/A≥93%) and the center of the circle with a radius r, at which the energy density is maximum within the circle, is set as the center of the projection image.

Note that the projection range of the excitation light is a range having an energy of $1/e^2$ or more of the maximum energy within the energy distribution of the excitation light projected onto the reflecting surface 102a. The energy density is obtained by dividing the energy included in the circle by the dimension of the circle. In other words, the energy density is obtained by the following equation:

Energy Density=(Energy included in Circle)/(Dimension of Circle)

Note that the center (the point P) of the projection image of the excitation light as defined above is determined with all the light source 101 within the light-source device 100 turned on.

Further, the light flux (light flux Q2) of the excitation light emitted from the phosphor unit 103 is a light flux of light rays passing through the range having the energy of $1/e^2$ or more of the maximum energy within the energy distribution of the excitation light on a plane perpendicular to the propagation direction of the excitation light.

In the light-source device 100 according to the present embodiment, the light flux Q2 of the excitation light emitted from the phosphor unit 103 does not intersect with the center (the point P, i.e., the center of the projection image of the excitation light) of the excitation light emitted from the light source 101 and projected on the reflecting surface 102a. Such a configuration prevents the excitation light from passing through the same location on the dichroic mirror 102, thus preventing the dichroic mirror 102 from being damaged due to an increase in the light condensing density. Further, in the present embodiment, particular optical elements such as a phase-contrast plate and a polarization splitter are not used to separate the optical path of the excitation light emitted from the phosphor unit 103, from the other optical path. This configuration reduces the number of components and the cost for producing the device, thus achieving a reduction in the size of the device.

In the light-source device 100 illustrated in FIGS. 1A and 1B, the phosphor unit 103 alternately emits the excitation light and the fluorescence in a sequential manner. In other words, the case in which the phosphor unit 103 emits the excitation light and the fluorescence in a time-division manner is described. However, the configuration of the phosphor unit 103 is not limited thereto, and the phosphor unit 103 may be configured to emit excitation light and fluorescence simultaneously.

For example, instead of the first and second regions, the phosphor unit 103 has a region (a third region) that reflects a portion of the excitation light and converts the other portion of the excitation light into a fluorescence different from the excitation light. For example, the wavelength converting member provided in the third region serves to perform the reflection of the excitation light and the conversion into the fluorescence. The phosphor unit 103 is sometimes referred to as a stationary phosphor unit. Once the excitation light is incident on the phosphor unit 103, the phosphor unit 103 emits the excitation light and the fluorescence light together to the incident-plane side (upward in FIG. 1A) on which the excitation light has been incident on the phosphor unit 103. In the configuration including the phosphor unit 103 described above, the same advantageous effect can be obtained as in the case in which the phosphor unit 103 operates in a time-division manner.

In some examples, the light-source device 100 in FIG. 1 may include a light guide configured to guide at least one of the excitation light and the fluorescence emitted from the phosphor unit 103 to the rod integrator 104. For example, the light guide includes a condenser lens and a refractive lens and is arranged in an optical path between the phosphor unit 103 and the rod integrator 104. With the provision of the light guide, at least one of the excitation light and the second color light emitted from the phosphor unit 103 is effectively guided to the rod integrator 104, and the utilization efficiency of light can be improved.

Figure 2:
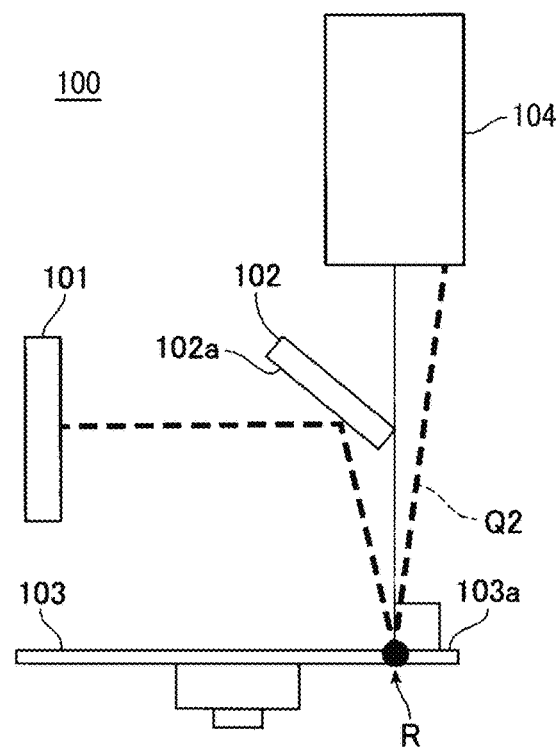
FIG. 2 is a schematic diagram of the light-source device according an embodiment of the present disclosure.

Further, in the light-source device 100 according to an embodiment, the position of the rod integrator 104 may be changed where appropriate from the viewpoint of improving the utilization efficiency of at least one of the excitation light and the fluorescence incident on the rod integrator 104. FIG. 2 is a schematic diagram of the light-source device 100 according another embodiment of the present disclosure. In FIG. 2, the same reference numerals are given to the same components as those in FIG. 1, and the description thereof will be omitted. In the light-source device illustrated in FIG. 2, the reflecting surface 102a is formed over the surface of the dichroic mirror 102. The same applies to the drawings to be described below.

In the embodiment illustrated in FIG. 2, the center of the projection image of excitation light emitted from the dichroic mirror 102 and projected onto the phosphor unit 103 is designated as a point R. In this case, it is preferably that the rod integrator 104 is disposed on the normal to the point R on the exit plane 103a of the phosphor unit 103. With such an arrangement of the rod integrator 104, the fluorescence, which is vertically emitted relative to the exit plane 103a of the phosphor unit 103, can be incident on the rod integrator 104 effectively. Thus, the utilization efficiency of the fluorescence can be improved.

Figure 3:
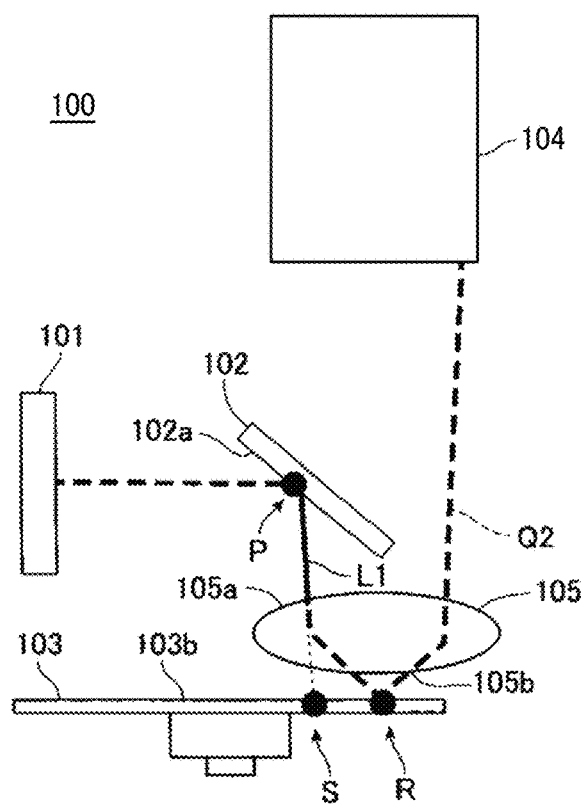
FIG. 3 is a schematic diagram of the light-source device according to an embodiment of the present disclosure.

In some examples, a condensing element may be provided on an optical path between the dichroic mirror 102 and the phosphor unit 103 in the light-source device 100 according to an embodiment of the present disclosure. Such a condensing element serves to converge the excitation light reflected by the dichroic mirror 102 and collimates or substantially collimates the fluorescence emitted from the phosphor unit 103. For example, the condensing element is a condenser lens. FIG. 3 is a schematic diagram of the light-source device 100 according to an embodiment of the present disclosure. In FIG. 3, the same reference numerals are given to the same components as those in FIG. 1, and the description thereof will be omitted.

In the light-source device 100 illustrated in FIG. 3, a condenser lens 105 as the condensing element is disposed in the optical path between the dichroic mirror 102 and the phosphor unit 103. The condenser lens 105 condenses the excitation light reflected by the dichroic mirror 102 and substantially parallelizes the fluorescence light emitted from the phosphor unit 103.

FIG. 3 indicates a straight line L1 connecting the above-described point P on the reflecting surface 102a and the center of the projection image on an incident surface 105a of the condenser lens 105, the projection image being formed by the excitation light that has been reflected by the reflecting surface 102a of the dichroic mirror 102 and incident on the condenser lens 105. Further, FIG. 3 also indicates a point S that is a point of intersection of the straight line L1 and an incident plane 103b of the phosphor unit 103 on which the excitation light that has been condensed by the condenser lens 105 is incident. In the light-source device 100, the above-described point S is located at a different position from a point R that is the center of the projection image of the excitation light projected onto the phosphor unit 103. With such an arrangement of the condenser lens 105, the excitation light and the fluorescence, which are to be emitted from the phosphor unit 103 while diverging, can be collimated. Accordingly, the collimated excitation light and fluorescence can be incident on the rod integrator 104 effectively, thus improving the utilization efficiency of light.

In the light-source device 100 illustrated in FIG. 3, it is desired that the above-described straight line L1 intersect perpendicularly with the incident plane 103b of the phosphor unit 103. With such a configuration that the straight line L1 intersects perpendicularly with the incident plane 103b of the phosphor unit 103, the distance between the dichroic mirror 102 and the phosphor unit 103 can be reduced, and the size of the entire light-source device 100 can be reduced.

In the case where light passes through an optical element having a certain thickness, the incident surface is a surface on which the light is incident, and the exit surface is a surface from which the light is emitted. For example, in the condenser lens 105 as illustrated in FIG. 3, the incident surface 105a is a surface that light reflected by the reflecting surface 102a of the dichroic mirror 102 is incident on, and the exit surface 105b is a surface from which the light that has been incident on the incident surface 105a and passed through the condenser lens 105 is emitted toward the phosphor unit 103 side.

Figure 4:
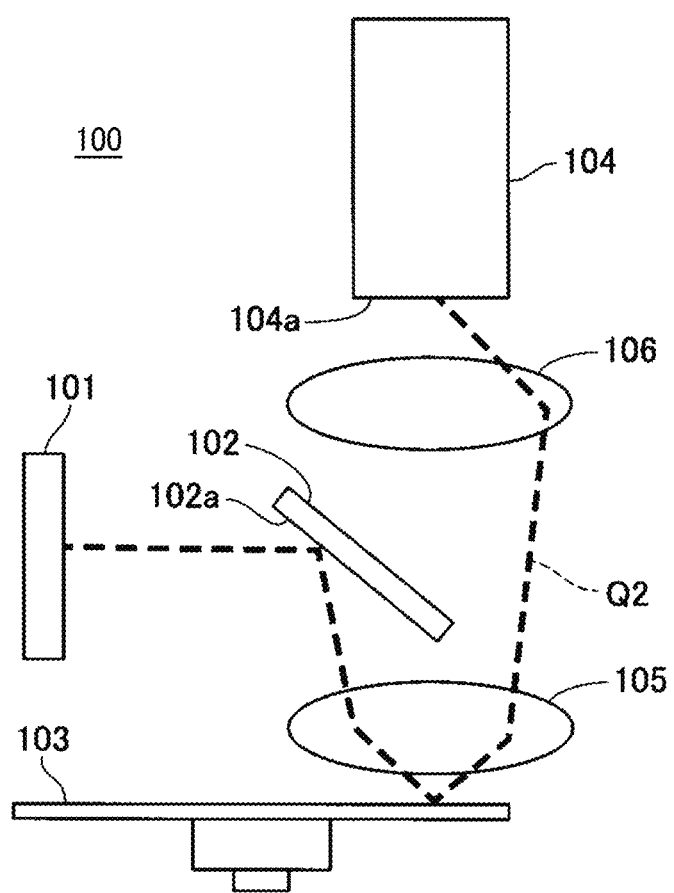
FIG. 4 is a schematic diagram of the light-source device according to an embodiment of the present disclosure.

In the light-source device 100 according to an embodiment of the present disclosure, a refractive optical element may be disposed in the optical path between the condenser lens and the rod integrator 104. Such a refractive optical element serves to converge the excitation light and/or fluorescence collimated by the condensing element (the condenser lens 105) and guide the converged excitation light and fluorescence to the rod integrator 104. For example, the refractive optical element is a refractive lens. FIG. 4 is a schematic diagram of the light-source device 100 according to an embodiment of the present disclosure. In FIG. 4, the same reference numerals are given to the same components as those in FIG. 3, and the description thereof will be omitted.

In the light-source device 100 illustrated in FIG. 4, a refractive lens 106 as the refractive optical element is disposed in the optical path between the condenser lens 105 and the rod integrator 104. The refractive lens 106 serves to condense (refract) the excitation light and/or the fluorescence, which are collimated by the condensing element (condenser lens 105) and guide the converged excitation light and fluorescence light to an incident aperture 104a of the rod integrator 104. With such an arrangement of the refractive lens 106, the excitation light and/or fluorescence collimated by the condenser lens 105 can be efficiently incident on the rod integrator 104, thus improving the utilization efficiency of light.

In the light-source device 100 illustrated in FIG. 4, it is desired that the rod integrator 104 be disposed so as to homogenize the excitation light and/or fluorescence to be incident on the rod integrator 104. More specifically, when the inner surface cross section of the rod integrator 104 is rectangular, preferably, the rod integrator 104 is disposed so that the excitation light or the like to be incident on the rod integrator 104 is incident on the inner side surface of the rod integrator 104 corresponding to the longer side.

Further, in the light-source device 100 in FIG. 4, it is desired that the light source 101 be disposed to substantially prevent vignetting of the excitation light on the reflecting surface 102a of the dichroic mirror 102. More specifically, when the light-emitting surface of the light source 101 is rectangular, preferably, the light source 101 is disposed such that the width of the excitation light is narrower.

Figure 5A:
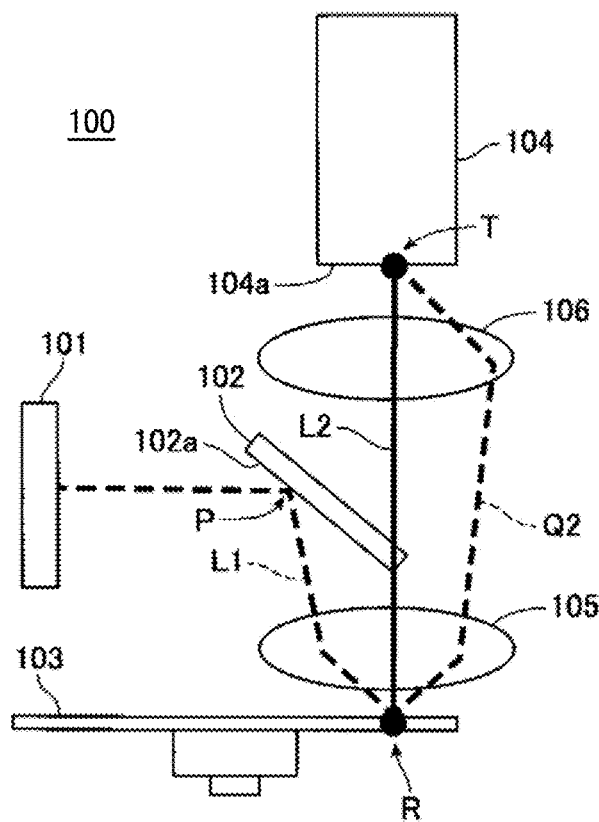
FIGS. 5A, 5B, and 5C are schematic diagrams of the light-source device according to an embodiment of the present disclosure.
Figure 5B:
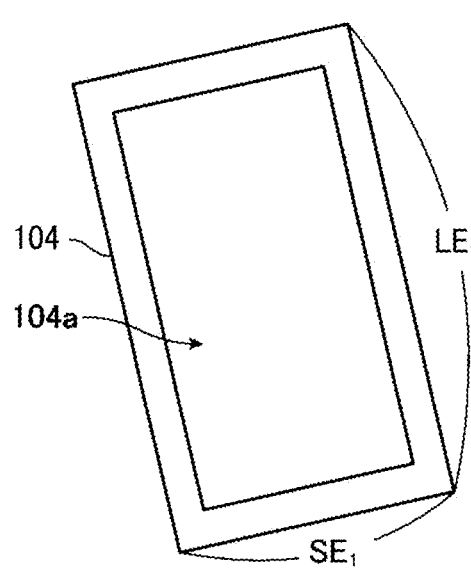
Figure 5C:
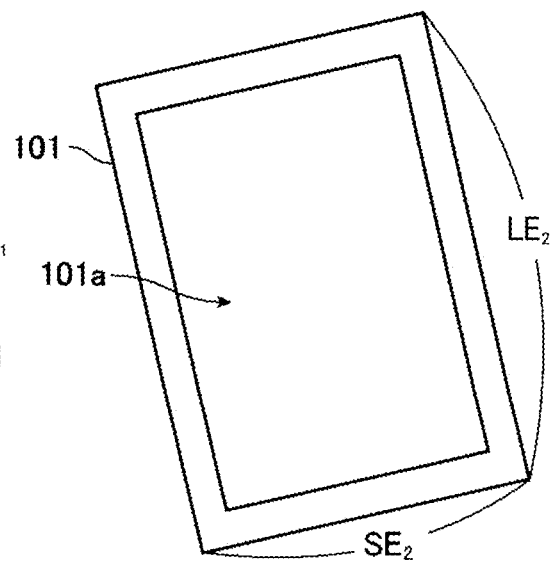

FIGS. 5A, 5B, and 5C are schematic diagrams of the light-source device 100 according to an embodiment. In FIGS. 5A, 5B, and 5C, the same reference numerals are given to the same components as those in FIG. 4, and the description thereof will be omitted. FIG. 5A is an illustration of the constituent elements of the light-source device 100 according to the present embodiment. FIG. 5B is an illustration of the incident aperture 104a of the rod integrator 104 of the light-source device 100. FIG. 5C is an illustration of the light source of the light-source device 100. FIG. 5B indicates the incident aperture 104a of the rod integrator 104 as viewed from the phosphor unit 103 side. FIG. 5C indicates the light-emitting surface of the light source 101 as viewed from the dichroic mirror 102 side.

In the light-source device 100 illustrated in FIG. 5A, a point T is the center of the projection image projected on the incident aperture 104a of the rod integrator 104, the projection image being formed by the excitation light and/or the fluorescence condensed (refracted) by the refractive lens 106. Further, a straight line L2 is a straight line connecting the point T and a certain point R that is the center of the projection image of the excitation light projected on the phosphor unit 103. As illustrated in FIG. 5B, the incident aperture 104a of the rod integrator 104 has a rectangular shape having a longer side $LE_1$ and a shorter side $SE_1$. In the incident aperture 104a of the rod integrator 104, the direction of the shorter side $SE_1$ is referred to as a "predetermined axial direction", and the direction of the longer side $LE_1$ is referred to as a "direction orthogonal to the predetermined axial direction". The incident aperture 104a of the rod integrator 104 may have a rectangular shape having a longer side $LE_1$ and a shorter side $SE_1$ or may have an elliptical shape having a longer side $LE_1$ and a shorter side $SE_1$ (for example, may have a shape having a longer side $LE_1$ and a shorter side $SE_1$). Further, as illustrated in FIG. 5C, the light-emitting surface 101a of the light source has a rectangular shape having a longer side $LE_2$ and a shorter side $SE_2$. In the light-emitting surface 101a of the light source 101, the direction of the shorter side $SE_2$ is referred to as a "predetermined axial direction", and the direction of the longer side $LE_2$ is referred to as a "direction orthogonal to the predetermined axial direction". The light-emitting surface 101a of the light source 101 may have a rectangular shape (rectangular shape) having a longer side $LE_2$ and a shorter side $SE_2$, or may have an elliptical shape having a longer side $LE_2$ and a shorter side $SE_2$ (for example, may have a shape having a longer side $LE_2$ and a shorter side $SE_2$).

In the light-source device 100, preferably, a plane (a plane including the surface of the drawing sheet in which FIG. 5A is drawn) including the straight line L1 and the straight line L2 is substantially parallel to the shorter side $SE_1$ of the incident aperture 104a of the rod integrator 104. In other words, the rod integrator 104 is arranged such that the shorter side $SE_1$ of the rod integrator 104 in FIG. 5B is parallel to the drawing sheet of FIG. 5A. With such an arrangement of the rod integrator 104, the excitation light can strike on the inner side surface corresponding to the longer side $LE_1$ of the incident aperture 104a of the rod integrator 104 so as to be incident on the rod integrator 104. Accordingly, the number of reflection of the excitation light or the like within the rod integrator 104 is increased, and the excitation light or the like is homogenized, thus preventing unevenness in the color of the excitation light or the like.

In the light-source device 100, preferably, the plane including the straight line L1 and straight line L2 (the plane including the surface of the drawing sheet in which FIG. 5A is drawn) is substantially parallel to the shorter side $SE_2$ of the light-emitting surface 101a of the light source 101. In other words, the light source 101 is arranged such that the shorter side $SE_2$ of the light-emitting surface 101a in FIG. 5C is parallel to the drawing sheet of FIG. 5A. With such an arrangement of the light source 101, the width of the light flux extending in a direction in which the plane including the straight lines L1 and L2 extends can be reduced. This prevents vignetting on the reflecting surface 102a of the dichroic mirror 102, and the reduction in the utilization efficiency of light can be prevented. Further, the light reflected by the phosphor unit 103 can be prevented from interfering with the dichroic mirror 102, and the reduction in the utilization efficiency of light can be prevented as well.

Further, in the light-source device 100 according to the present embodiment, the rod integrator 104 is preferably disposed such that an angle α formed by a projection straight line of the excitation light (first color light) incident on the incident aperture 104a of the rod integrator 104 and the shorter side SE (predetermined axial line) of the incident aperture 104a is smaller than a predetermined value. The rod integrator 104 is preferably disposed such that an angle β formed by the excitation light (first color light) incident on the incident aperture 104a of the rod integrator 104 and the incident aperture 104a is smaller than a predetermined value.

Figure 6A:
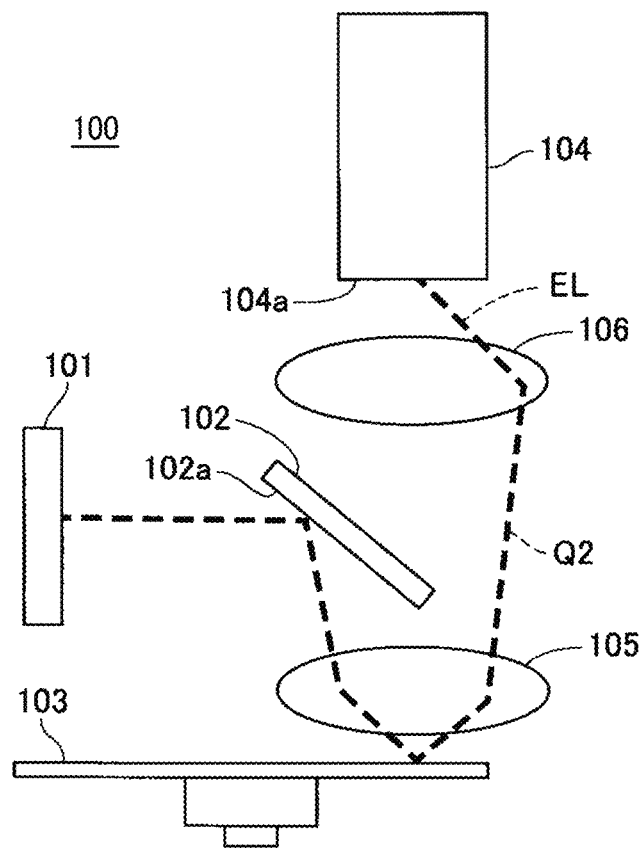
FIGS. 6A, 6B, and 6C are schematic diagrams of the light-source device according to an embodiment of the present disclosure.
Figure 6B:
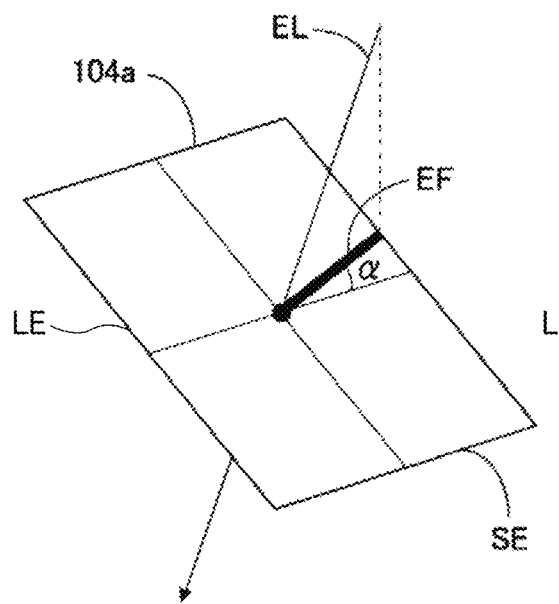
Figure 6C:
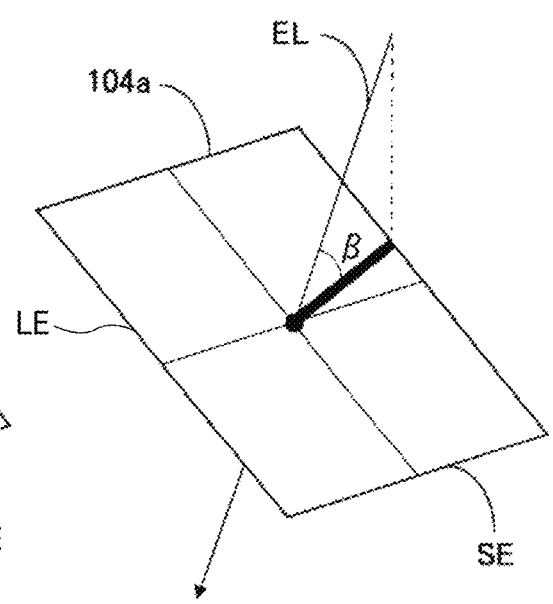

FIGS. 6A, 6B, and 6C are schematic diagrams of the light-source device 100 according to an embodiment of the present disclosure. In FIGS. 6A, 6B, and 6C, the same components as those in FIG. 5A are denoted by the same reference numerals, and description thereof will be omitted. FIG. 6A is an illustration of the constituent elements of the light-source device 100 according to the present embodiment. FIGS. 6B and 6C are illustrations of the incident plane of the excitation light to be incident on the incident aperture 104a of the rod integrator 104 included in the light-source device 100. FIG. 6A indicates the optical path of the excitation light in the light-source device 100.

In the light-source device 100 illustrated in FIG. 6A, the excitation light EL (incident light) is light that is condensed by the refractive lens 106 and incident on the incident aperture 104a. In the light-source device 100, the rod integrator 104 is disposed such that an angle α formed by a projection straight line of the excitation light (first color light) incident on the incident aperture 104a and the shorter side SE (predetermined axial line) of the incident aperture 104a is smaller than a predetermined value. The rod integrator 104 is disposed such that an angle β formed by the excitation light (first color light) incident on the incident aperture 104a of the rod integrator 104 and the incident aperture 104a is smaller than a predetermined value.

Here, the projection straight line is defined as a straight line obtained when an incident light ray is orthographically projected on a certain surface (target surface) in a case in which a certain light ray is incident on the target surface. In a case in which the incident aperture 104a is the target surface, a projection straight line of the excitation light (incident light) EL with respect to the incident aperture 104a is a straight line EF obtained when the excitation light EL is orthographically projected onto the incident aperture 104a as illustrated in FIG. 6B.

As illustrated in FIG. 6B, in a case in which the angle formed by the projection straight line EF of the excitation light (first color light) EL incident on the incident aperture 104a of the rod integrator 104 and the predetermined axial line (shorter side SE) of the incident aperture 104a of the rod integrator 104 is α, the angle α is set to be smaller than 40°. The angle α is defined in a plane including the longer side LE and the shorter side SE of the incident aperture 104a of the rod integrator 104. With such an arrangement of the rod integrator 104, the excitation light can be incident on the rod integrator 104 to strike on the inner side surface having the longer side LE of the incident aperture 104a of the rod integrator 104. Accordingly, as the number of reflections of the excitation light and the like within the rod integrator 104 is increased, the excitation light can be homogenized, thus restraining the occurrence of color unevenness in the excitation light or the like.

Further, as illustrated in FIG. 6C, in a case in which the angle formed by the excitation light (first color light) EL incident on (the incident aperture 104a of) the rod integrator 104 and the incident aperture 104a of the rod integrator 104 is β, the angle β is set to be smaller than 40°. The angle θ is defined as the angle formed by a plane including the longer side LE and the shorter side SE of the incident aperture 104a of the rod integrator 104 and the excitation light (first color light) EL that is incident on the plane so as to intersect with the plane. Such arrangement of the rod integrator 104 can prevent the excitation light from being incident perpendicularly to the incident aperture 104a of the rod integrator 104. Accordingly, the excitation light and the like can strike the inside of the rod integrator 104 well, and the excitation light can be homogenized as the number of reflections of the excitation light and the like increases. Thus, the occurrence of color unevenness and the like in the excitation light and the like can be restrained.

Further, in the light-source device 100 according to an embodiment of the present disclosure, it is desired that the rod integrator 104 be disposed according to the relative position of the refractive lens 106 and the rod integrator 104. For example, in the light-source device 100 according to the present embodiment, the center of the projection image of the excitation light projected onto the incident aperture 104a of the rod integrator 104, the center of the fluorescence projected onto the incident aperture 104a of the rod integrator 104, and the optical axis of the refractive lens 106 intersect at one point.

Figure 7A:
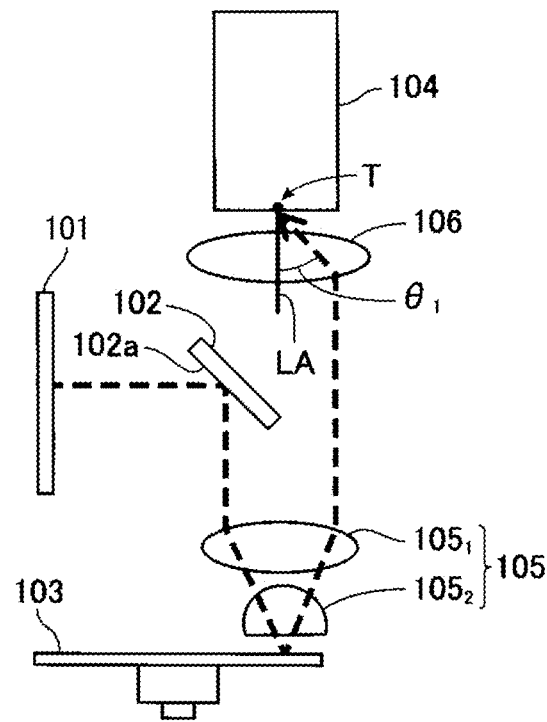
FIGS. 7A and 7B are schematic diagrams of the light-source device according to an embodiment of the present disclosure.
Figure 7B:
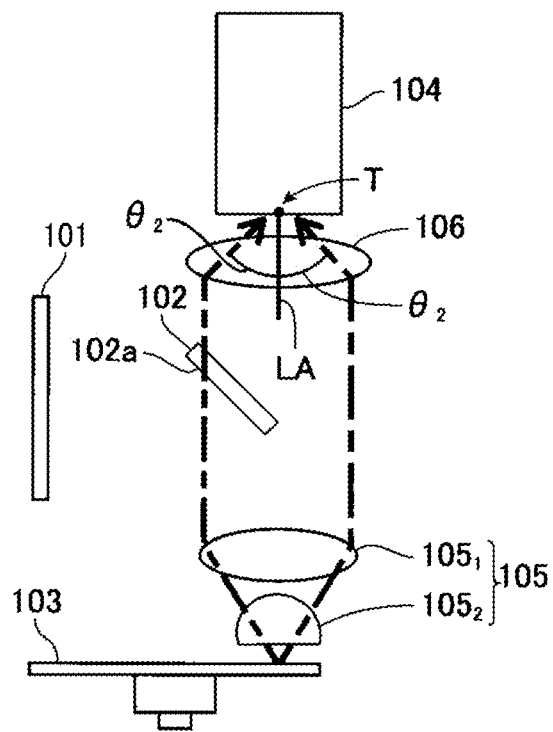

FIGS. 7A and 7B are schematic diagrams of the light-source device 100 according to an embodiment of the present disclosure. In FIGS. 7A and 7B, the same components as those in FIG. 5A are denoted by the same reference numerals, and description thereof will be omitted. FIG. 7A indicates the optical path of the excitation light in the light-source device 100, and FIG. 7B indicates the optical path of the fluorescence in the light-source device 100. FIGS. 7A and 7B also depict a pair of condenser lenses 1051 and 1052 arranged along a propagation direction of light, for convenience of illustration.

In the light-source device 100 illustrated in FIGS. 7A and 7B, both the center of the projection image on the incident aperture 104a of the rod integrator 104, the projection image being formed by the excitation light converged by the refractive lens 106, and the center of the projection image on the incident aperture 104a of the rod integrator 104, the projection image being formed by the fluorescence converged by the refractive lens 106 are the above-described point T. Further, the refractive lens 106 is arranged so that the optical axis LA of the refractive lens 106 passes through the point T. For this reason, the center of the projection image of the excitation light projected onto the incident aperture 104a of the rod integrator 104, the center of the projection image of the fluorescence projected onto the incident aperture 104a of the rod integrator 104, and the optical axis LA of the refractive lens intersect at one point. This arrangement enables the excitation light and the fluorescence to be incident on the center of the incident aperture 104a of the rod integrator 104, and thus substantially prevents the occurrence of the vignetting on the incident aperture 104a of the rod integrator 104. As a result, the utilization efficiency of light can be improved. In addition, a reduction in the utilization efficiency of light, caused by misalignment of the optical elements within the light-source device 100 due to component tolerances, can also be substantially prevented.

Further, in the light-source device 100 according to the present embodiment, the refractive lens 106 is arranged so that the angle at which each of the excitation light and the fluorescence (fluorescence light) is incident on the incident aperture 104a of the rod integrator is set within a certain range. Note that the angle of the light ray with respect to the incident aperture 104a refers to an angle between the light ray and the normal line of a plane parallel to the incident aperture 104a. For example, in the light-source device 100, the maximum incident angle of a light ray of the excitation light with respect to the incident aperture 104a is smaller than the maximum incident angle of a light ray of the fluorescence with respect to the incident aperture 104a.

As illustrated in FIGS. 7A and 7B, an angle $\theta_1$ is the maximum incident angle of the light ray of the excitation light with respect to the incident aperture 104a, and an angle $\theta_2$ is the maximum incident angle of the light ray of the fluorescence with respect to the incident aperture 104a. In the light-source device 100, it is desired that the angle $\theta_1$ be set smaller than the angle $\theta_2$. By making the incident angle $\theta_1$ of the excitation light smaller than the incident angle $\theta_2$ of the fluorescence, the occurrence of vignetting in an optical system arranged downstream of the light-source device 100 is substantially prevented, and thus the utilization efficiency of light is improved.

In the light-source device 100 according to an embodiment of the present disclosure, the incident angle $\theta_1$ of the excitation light and the incident angle $\theta_2$ of the fluorescence may be set equal to each other. By making the incident angle $\theta_1$ of the excitation light equal to the incident angle $\theta_2$ of the fluorescence, the distribution of the excitation light projected on the DMD or the screen is made substantially the same as the distribution of the fluorescence projected on the DMD or the screen. Accordingly, the unevenness in the color of the excitation light or the like can be substantially prevented.

Further, in the light-source device 100 according to the present embodiment, the optical properties of the rod integrator 104 may be selected according to the relation of the incident angle $\theta_1$ of the excitation light and the incident angle $\theta_2$ of the fluorescence. For example, in the light-source device 100, the rod integrator 104 is formed of a glass rod integrator, and the total reflection condition of the glass rod integrator is set to be larger than the incident angle $\theta_1$ of the excitation light and the incident angle $\theta_2$ of the second color light.

Figure 8:
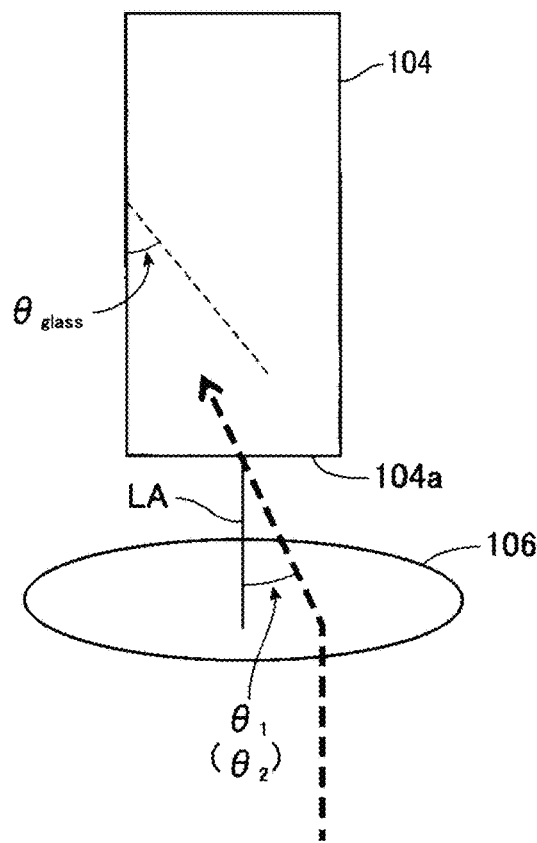
FIG. 8 is a schematic diagram illustrating the optical properties of the rod integrator in the light-source device according to an embodiment of the present disclosure.

FIG. 8 is a schematic diagram for describing the optical properties of the rod integrator 104 in the light-source device 100 according to an embodiment of the present disclosure. In the light-source device 100 illustrated in FIG. 8, the rod integrator 104 is formed of a glass rod integrator. The total reflection condition in the rod integrator 104 is assumed to be an angle $\theta_{glass}$. In this case, the angle $\theta_{glass}$ is set to be larger than the incident angle $\theta_1$ of the excitation light and the incident angle $\theta_2$ of the fluorescence. With such a configuration, loss of the excitation light and the like inside the rod integrator 104 is prevented, and thus the utilization efficiency of light is improved.

Figure 9:
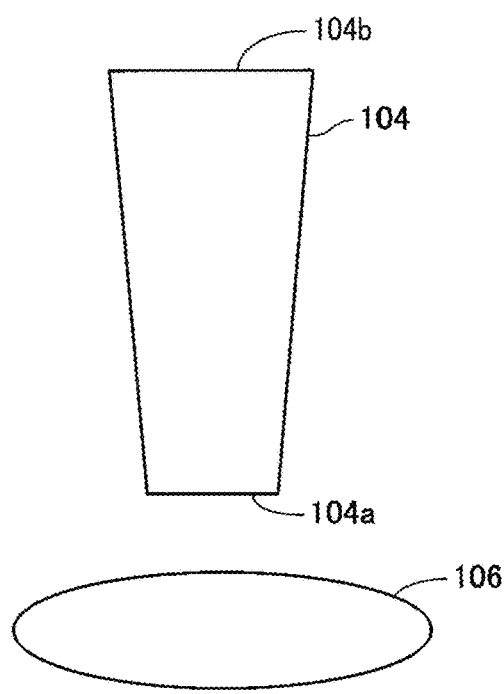
FIG. 9 is a schematic diagram illustrating the optical properties of the rod integrator in the light-source device according to another embodiment of the present disclosure.

FIG. 9 is also a schematic view for describing the optical properties of the rod integrator 104 included in the light-source device 100 according to another embodiment of the present disclosure. In the light-source device 100 in FIG. 9, the rod integrator 104, which constitutes a light mixing element, has a tapered shape in which the incident aperture 104a is smaller than an exit aperture 104b. With such a tapered shape of the rod integrator 104, the exit angle at which light exits the rod integrator 104 can be made small. Accordingly, the occurrence of vignetting in an optical system arranged downstream of the light-source device can be substantially prevented, and thus the utilization efficiency of light can be improved.

Other embodiments of the present disclosure are described below. The embodiments described below indicate some examples of the light-source device and the image projection apparatus, and the configurations thereof may be changed where appropriate. Further, the respective embodiments may be combined where appropriate.

First Embodiment

Figure 10:
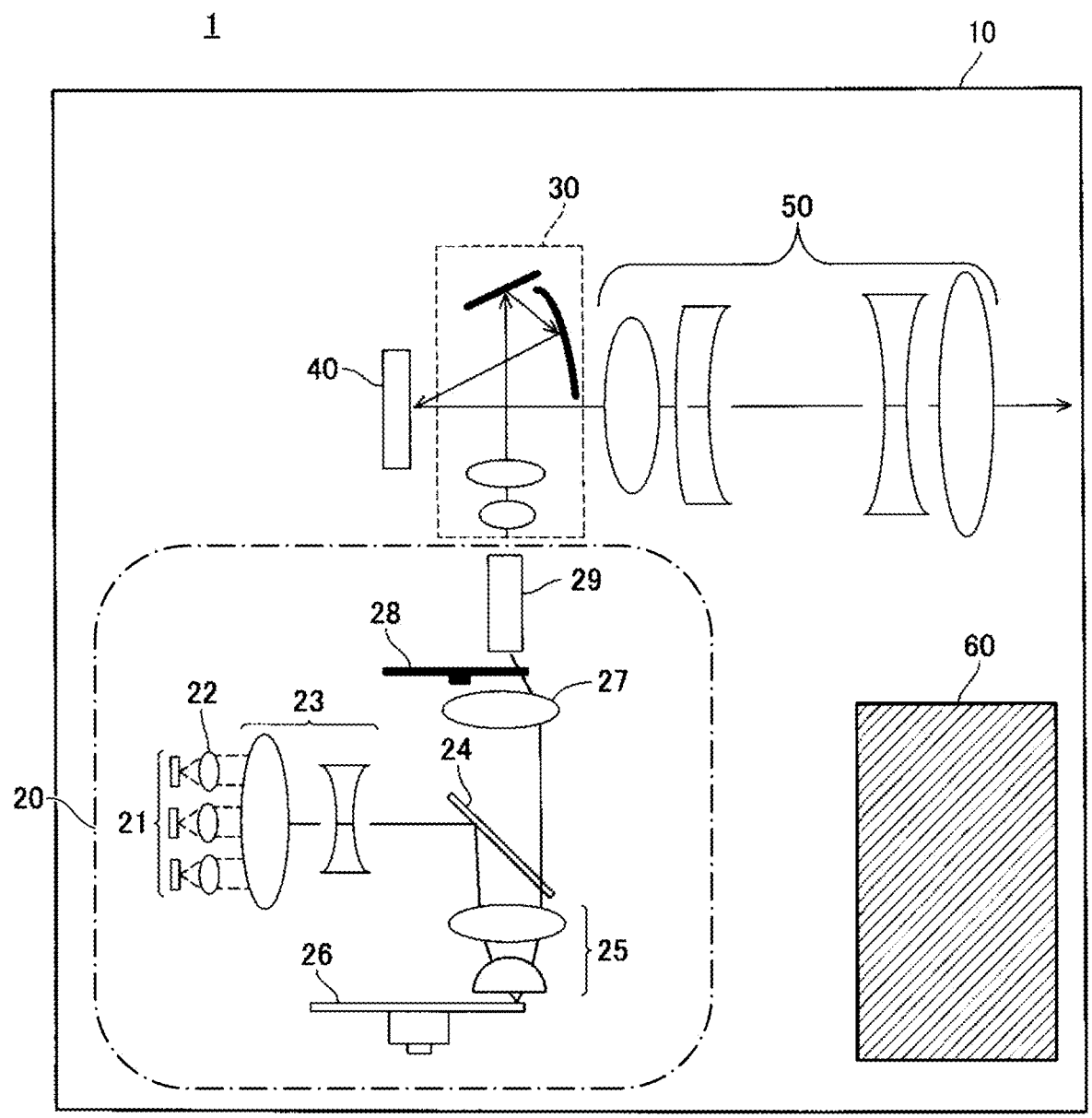
FIG. 10 is a schematic diagram of a projector provided with a light-source device according to a first embodiment.

FIG. 10 is a schematic diagram of a projector 1 (image projection apparatus) provided with a light-source device 20 according to a first embodiment. As illustrated in FIG. 10, the projector 1 includes a housing 10, a light-source device 20, an illumination optical system 30, an image forming element (image display element) 40, a projection optical system 50, and a cooling device 60.

The housing 10 houses the light-source device 20, the illumination optical system 30, the image forming element 40, the projection optical system 50, and the cooling device 60. The light-source device 20 emits, for example, light beams having wavelengths corresponding to colors of RGB. An inner configuration of the light-source device 20 is described later in detail.

The illumination optical system 30 illuminates the image forming element 40 substantially uniformly with the light uniformized by a light tunnel 29, which is described later, included in the light-source device 20. The illumination optical system 30 includes, for example, one or more lenses and one or more reflecting surfaces.

The image forming element 40 modulates light provided for illumination by the illumination optical system 30 (light from a light-source optical system of the light-source device 20) to form an image. The image forming element 40 includes, for example, a digital micromirror device (DMD) or a liquid crystal display element. The image forming element drives the minute mirror surface in synchronization with light beams (blue light, green light, red light, and yellow light) emitted from the illumination optical system 30, and generates a color image.

The projection optical system 50 magnifies and projects the image (the color image) formed by the image forming element 40 onto a screen (projection surface). The projection optical system 50 includes, for example, at least one lens. The cooling device 60 cools each of the elements and devices that take heat in the projector 1.

Figure 11A:
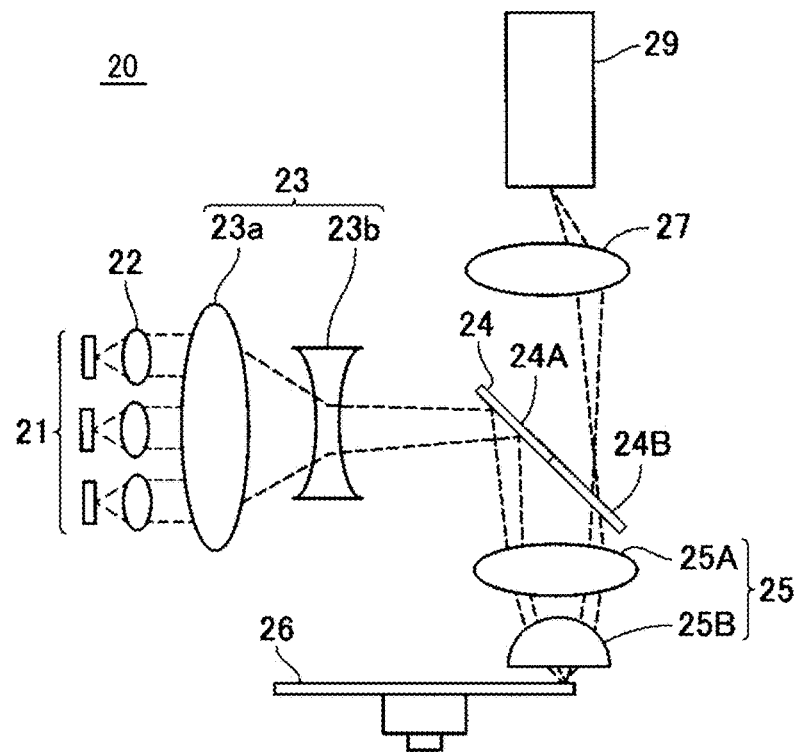
FIGS. 11A and 11B are schematic views of the light-source device according to the first embodiment.
Figure 11B:
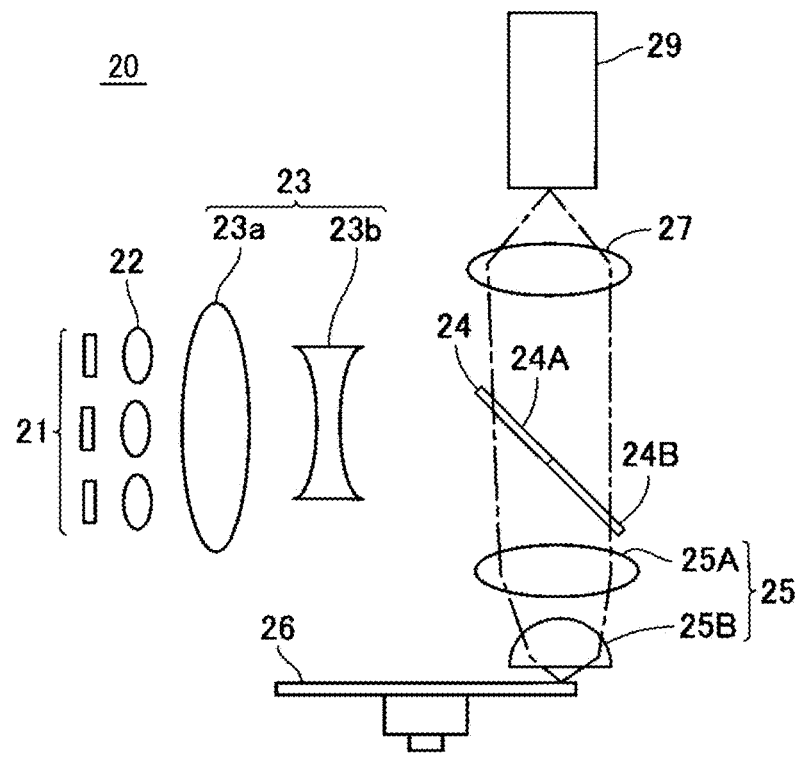

FIGS. 11A and 11B are illustrations of the configuration of the light-source device 20 according to the first embodiment. FIG. 11A indicates the optical path of the blue laser beam in the light-source device 20, and FIG. 11B indicates the optical path of the fluorescence in the light-source device 20.

As illustrated in FIG. 11A, the light-source device 20 includes a laser source (excitation light source) 21, a coupling lens 22, a first optical system 23, and a dichroic mirror that is an example of an optical element, a second optical system 25, a phosphor unit 26 as an example of the wavelength conversion unit, a refractive optical system 27, a color wheel 28, and a light tunnel 29 as an example of the light mixing element, which are sequentially arranged in the light propagation direction.

In FIGS. 11A and 11B, the color wheel 28 is omitted for convenience of description. The color wheel 28 is described with reference to FIG. 10. In the present embodiment, the color wheel 28 is described as a component of the light-source device 20. However, the configuration of the light-source device 20 is not limited to the above-described configuration, and the color wheel 28 may not be included in the light-source device 20.

In the laser source 21, for example, a plurality of light sources are arranged in array to emit a plurality of laser beams. The laser source 21 emits, for example, light (blue laser beam) in a blue band where the center wavelength of emission intensity is 455 nm. Hereinafter, the blue laser beam is referred to simply as blue light. The blue light emitted from the laser source 21 is linearly polarized light whose polarization direction is a specific direction, and is also used as excitation light that is excited by fluorescent material or phosphor of the phosphor unit 26, which is to be described later.

The light emitted by the laser source 21 is not limited to light in the blue wavelength band and may be light with wavelengths that can excite the fluorescent material. Further, the laser source 21 has a plurality of light sources in the first embodiment, but is not limited thereto. In some examples, the laser source 21 may be configured by one light source. In addition, the laser source 21 may be configured as a plurality of light sources arranged in array on a substrate, but is not limited thereto, and may have another arrangement configuration.

The coupling lens 22 is a lens that receives blue light emitted from the laser source and converts the blue light into parallel light (collimated light). In the following description, the term "parallel light" is not limited to light that is completely collimated (parallelized), but includes substantially collimated light. The number of coupling lenses 22 may be increased or decreased in accordance with an increase or a decrease in the number of light sources of the laser source 21 so as to correspond to the number of light sources of the laser source 21.

In the light-source device 20 according to the present embodiment, the laser source and the coupling lens 22 constitute a light source unit. For example, the laser source 21 is configured by a plurality of laser diodes arranged in rows and columns. In other words, the light source unit includes the laser diodes and the coupling lenses 22 arranged on the light-emission surface side of the laser diodes.

Figure 12:
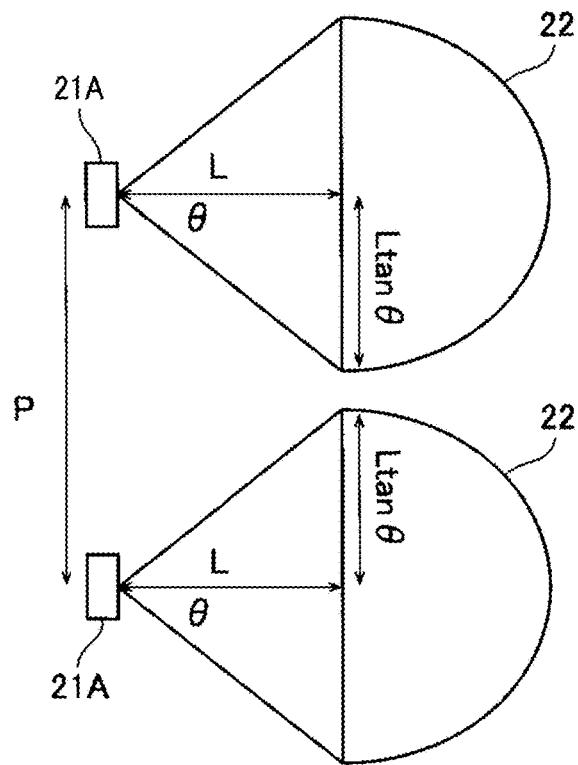
FIG. 12 is an illustration of the outline of a light source unit included in the light-source device according to the first embodiment.

FIG. 12 is an illustration of a main part of the light source unit included in the light-source device 20 according to the first embodiment. In the light source unit illustrated in FIG. 12, each coupling lens 22 is arranged to face a laser diode 21A. In the light source unit, when θ denotes a divergence angle of the blue light (excitation light) emitted from each laser diode 21A, the divergence angle being larger one between the row direction and the column direction, P denotes a pitch between adjacent laser diodes 21A, and L denotes a distance from a light-emitting point of a laser diode 21A to a corresponding coupling lens 22, the interval (P/L tan θ) between the laser diodes 21A is configured to satisfy Formula (1) below:

$$1 \leq P/L \tan \theta \leq 4 \quad (1)$$

Most preferably, the interval between the laser diodes 21A is configured to satisfy Formula (2) below:

$$P/L \tan \theta = 2 \quad (2)$$

Satisfying Formula (2) enables the downsizing of the light-emission surface of the laser source 21, and also enables the light emitted from each laser diode 21A to be incident on only the corresponding one of the coupling lenses 22. Accordingly, the light emitted from each laser diode 21A is prevented from being erroneously incident on another coupling lens adjacent to the corresponding coupling lens. Thus, a decrease in the utilization efficiency of light can be substantially prevented.

Note that the plurality of laser diodes 21A included in the light source unit are preferably arranged on the same substrate. With such an arrangement of the plurality of laser diodes 21A on the same substrate, the area of light emitted from the light source unit can be reduced, so that vignetting of light in various optical elements on the optical path can be substantially prevented. Thus, the utilization efficiency of light can be improved.

The first optical system 23 has positive power as a whole, and includes a large-diameter lens 23a and a negative lens 23b in order from the laser source 21 side to the phosphor unit 26 side. The large-diameter lens 23a is an example of a large-diameter element, and has positive power. The large-diameter lens 23a is a lens that converges and combines the collimated light beams emitted from the coupling lenses 22. The negative lens 23b is an example of a collimating element, and is configured by a lens that converts the blue light converged by the large-diameter lens 23a into parallel light (collimated light). The first optical system 23 guides the blue light (excitation light) that has been substantially collimated by the coupling lens 22 and has been incident on the first optical system 23 to the dichroic mirror 24 while converging the blue light.

The dichroic mirror 24 is arranged obliquely with respect to the propagation direction of the blue light emitted from the first optical system 23. More specifically, the dichroic mirror 24 is disposed with the front end portion tilted downward with respect to the propagation direction of the blue light emitted from the first optical system 23. The dichroic mirror 24 has an optical property that is capable of reflecting the blue light substantially collimated by the first optical system 23 and also capable of transmitting the fluorescence (the second color light) converted by the phosphor unit 26. For example, the dichroic mirror 24 is provided with a coat having the above-described optical property.

Figure 13:
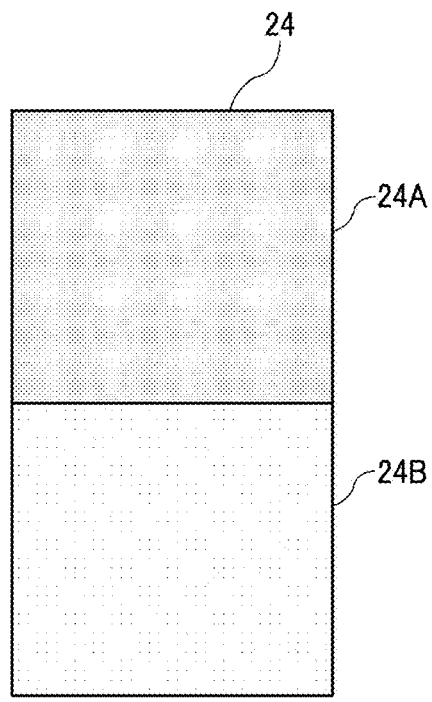
FIG. 13 is an illustration of an example of a dichroic mirror of the light-source device according to the first embodiment.

FIG. 13 is an illustration of an example of the dichroic mirror 24 of the light-source device 20 according to the first embodiment. FIG. 13 indicates the dichroic mirror 24 as viewed from the incident direction of the blue light emitted from the first optical system 23 side. As illustrated in FIG. 13, the dichroic mirror 24 is divided into two regions 24A and 24B. Hereinafter, for convenience of description, the regions 24A and 24B are referred to as a first region 24A and a second region 24B, respectively.

The first region 24A has the optical property that reflects the blue light emitted from the first optical system 23 (the negative lens 23b) while transmitting the fluorescence converted from the blue light by the phosphor of the phosphor unit 26 to be described later. The first region 24A forms the reflecting surface 102a as illustrated in FIG. 1A. The second region 24B has an optical property capable of transmitting the blue light and the fluorescence light.

The first region 24A is disposed on the optical axis of the first optical system 23, but is not disposed on the optical axis of the second optical system 25. The first region 24A is disposed closer to the first optical system 23 (the negative lens 23b) side relative to the optical axis of the second optical system 25. The second region 24B is not disposed on the optical axis of the second optical system 25, and disposed closer to the opposite side of the first optical system 23 relative to the optical axis of the second optical system 25.

The second optical system 25 has positive power as a whole, and includes a positive lens 25A and a positive lens 25B in order from the laser source 21 side to the phosphor unit 26 side. The second optical system 25 serves to converge the blue light reflected by the dichroic mirror 24 while guiding the blue light to the phosphor unit 26. Further, the second optical system 25 collimates the fluorescence light (the fluorescence) emitted from the phosphor unit 26. Note that the second optical system 25 is an example of the condensing element.

The blue light guided by the second optical system 25 is incident on the phosphor unit 26. The phosphor unit 26 switches between the function of reflecting the blue light emitted from the second optical system 25 and the function of causing the blue light to work as the excitation light while converting the blue light into fluorescence having a different wavelength band from a wavelength band of the blue light by using the phosphor. The fluorescence converted by the phosphor unit 26 is, for example, light in a yellow wavelength band where the center wavelength of the emission intensity is 550 nm.

Figure 14A:
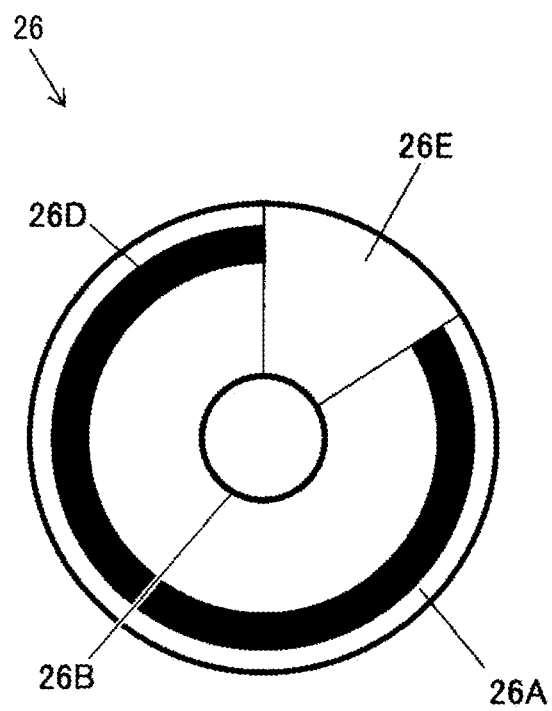
FIGS. 14A and 14B are illustrations of a configuration of a phosphor unit in the light-source device according to the first embodiment.
Figure 14B:
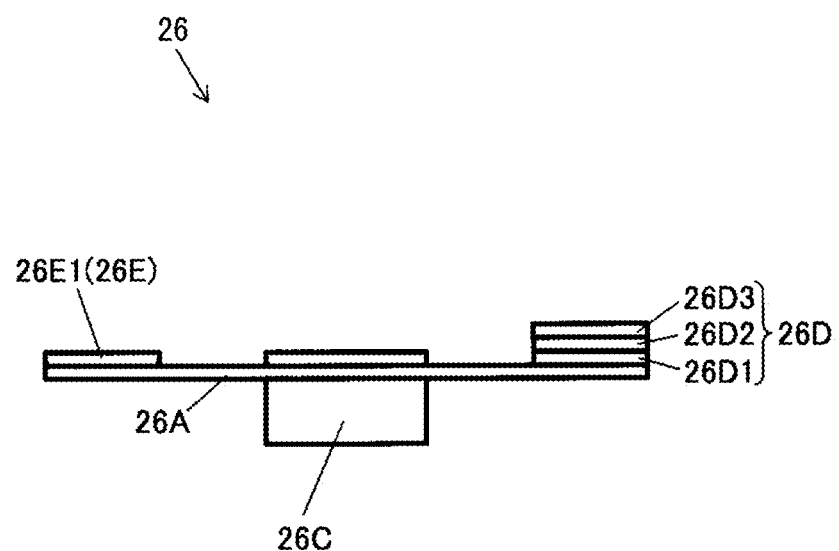

FIGS. 14A and 14B are illustrations of the configuration of the phosphor unit 26 of the light-source device 20 according to the first embodiment. In FIG. 14A, the phosphor unit 26 is viewed from the incident direction of the blue light. In FIG. 14B, the phosphor unit 26 is viewed from the direction orthogonal to the incident direction of the blue light. The configuration of the phosphor unit 26 illustrated in FIGS. 14A and 14B is only one example, is not limited thereto, and may be changed where appropriate.

As illustrated in FIG. 14A, the phosphor unit 26 includes a disk member (substrate or a disk body) 26A and a drive motor 26C (a drive unit) driven to rotate around a rotation axis 26B that is the straight line perpendicular to a plane of the disk member 26A. The disk member 26A may be, but is not limited to, for example, a transparent substrate or a metal substrate (for example, an aluminum substrate).

A large portion in the circumferential direction (in the first embodiment, an angular range of larger than 270°) of the phosphor unit 26 (disk member 26A) is assigned to a fluorescent region 26D, and a small portion in the circumferential direction (in the first embodiment, an angular range of smaller than 90°) is assigned to an excitation-light reflective region 26E. The excitation-light reflective region 26E constitutes an example of a first region that reflects (or diffusely reflects) the excitation light reflected by the dichroic mirror 24. The fluorescent region 26D constitutes an example of a region that converts the excitation light reflected by the dichroic mirror 24 into fluorescence (fluorescence light) and emits the fluorescence light. The fluorescent region 26D includes a reflection coat 26D1, a phosphor layer 26D2, and an anti-reflection coat (AR coat) 26D3 layered in this order from a lower-layer side toward an upper-layer side.

The reflection coat 26D1 has a characteristic of reflecting light in a wavelength region of the fluorescence (emission) by the phosphor layer 26D2. When the disk member 26A is made of a metal substrate with high reflectivity, the reflection coat 26D1 may be omitted. In other words, the disk member 26A may have the function of the reflection coat 26D1.

The phosphor layer 26D2 may use, for example, a substance in which a fluorescent material is dispersed into an organic or inorganic binder, a substance in which a crystal of a fluorescent material is directly formed, or a rare-earth phosphor such as a Ce:YAG-based substance. The phosphor layer 26D2 forms an example of a wavelength converting member that converts at least a portion of the excitation light into fluorescence light having a wavelength different from that of the excitation light and emits the fluorescence light. The wavelength band of the fluorescence (emission or emitted light) by the phosphor layer 26D2 may be, for example, the wavelength band of yellow, blue, green, or red. In the first embodiment, an example is described in which fluorescence (emission) has the wavelength band of yellow. While the fluorescence material is used as the wavelength conversion element in this embodiment, a phosphorescent body or a non-linear optical crystal may be used.

The anti-reflection coat 26D3 has a characteristic of preventing reflection of light at a surface of the phosphor layer 26D2.

A reflection coat (reflecting surface) 26E1 having a characteristic of reflecting light in the wavelength region of the blue light guided from the second optical system 25 is layered on the excitation-light reflective region 26E. When the disk member 26A is made of a metal substrate with high reflectivity, the reflection coat 26E1 may be omitted. In other words, the disk member 26A may have the function of the reflection coat 26E1.

By driving the disk member 26A to rotate by the drive motor 26C, the irradiation position of the blue light on the phosphor unit 26 moves with time. Consequently, a portion of the blue light (first color light) incident on the phosphor unit 26 is converted by the fluorescent region (wavelength conversion region) 26D into fluorescence (second color light) with a wavelength different from the wavelength of the blue light (first color light) and the fluorescence is emitted. The other portion of the blue light incident on the phosphor unit 26 is reflected by the excitation-light reflective region 26E without a change from the blue light.

The numbers and ranges of the fluorescent region 26D and the excitation-light reflective region 26E can be freely determined, and various changes can be made in design. For example, two fluorescent regions and two excitation-light reflective regions may be alternately arranged in the circumferential direction at intervals of 90°.

Returning to FIGS. 11A and 11B, the description of the configuration of the light-source device 20 will be continued. The refractive optical system 27 is a lens that condenses (converges) light (blue light and fluorescence) emitted from the second optical system 25. The light (blue light and fluorescence) emitted from the phosphor unit 26 passes through the dichroic mirror 24, and is then condensed (refracted) by the refractive optical system 27. Thus, the condensed light is incident on the color wheel 28 (see FIG. 9). The color wheel 28 is a member that separates the blue light and fluorescence light (fluorescence) generated by the phosphor unit 26 into desired colors.

Figure 15A:
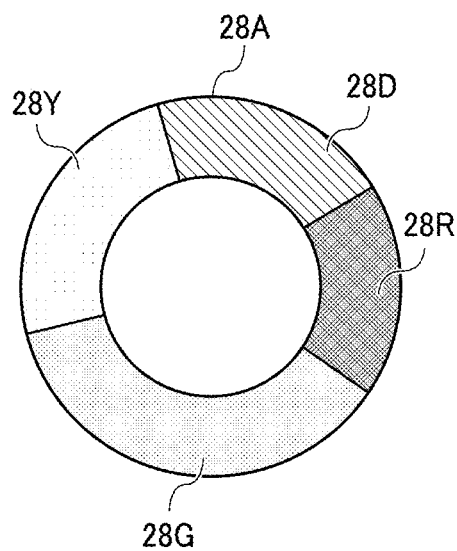
FIGS. 15A and 15B are illustrations of a configuration of a color wheel in the light-source device according to the first embodiment.
Figure 15B:
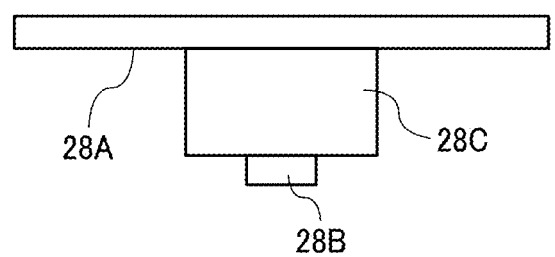

FIGS. 15A and 15B are illustrations of the configuration of the color wheel 28 of the light-source device 20 according to the first embodiment. In FIG. 15A, the color wheel 28 is viewed from the incident direction of the blue light and the fluorescence. In FIG. 15B, the color wheel 28 is viewed from the direction orthogonal to the incident direction of the blue light and the fluorescence. As illustrated in FIGS. 15A and 15B, the color wheel 28 includes a toroidal-shape member 28A and a drive motor (drive unit) 28C that drives the toroidal-shape member 28A to rotate around a rotation axis 28B.

The toroidal-shape member 28A is divided into a plurality of regions along the circumferential direction. In the toroidal-shape member 28A, the regions divided along the circumferential direction are a diffusion region 28D and filter regions 28R, 28G, and 28Y. The diffusion region 28D is a region that transmits and diffuses the blue light emitted from the phosphor unit 26. The filter region 28R is a region that transmits light having the wavelength range of the red component of the fluorescence emitted from the phosphor unit 26. Similarly, the filter regions 28G and 28Y are regions that transmit light having the wavelength range of the green component and light having the wavelength range of the yellow component of the fluorescence emitted from the phosphor unit 26, respectively.

In the above description, it is assumed that the color wheel 28 has regions through which the red, green, and yellow components of the fluorescence (the fluorescence light) are transmitted. However, the configuration of the color wheel 28 is not limited thereto. For example, the color wheel 28 may have regions through which a red component and a green component of the fluorescence light are transmitted.

The area ratio between the regions in the color wheel 28 is determined based on design specification of the projector 1. However, for example, since the diffusion region 28D in the color wheel 28 transmits the blue light emitted from the phosphor unit 26, the area ratio of the excitation-light reflective region 26E with respect to the entire area of the disk member 26A of the phosphor unit 26 may be equal to the area ratio of the diffusion region 28D with respect to the entire area of the color wheel 28.

The drive of the drive motor 28C rotates the toroidal-shape member 28A in the circumferential direction. With the rotation of the toroidal-shape member 28A in the circumferential direction, the blue light emitted from the phosphor unit 26 is incident on the diffusion region 28D and the fluorescence emitted from the phosphor unit 26 is sequentially incident on the filter regions 28R, 28G, and 28Y. The light (the blue light and the fluorescence) emitted from the phosphor unit 26 is transmitted through the color wheel 28, so that the blue light, green light, red light, and yellow light are sequentially emitted from the color wheel 28. The light transmitted through each region of the color wheel 28 is then incident on the light tunnel 29.

The light tunnel 29 is an optical element in which four mirrors form inner surfaces of a quadrangular prism. The light tunnel 29 serves as a light uniformizing element to cause the light incident on the one end of the quadrangular prism to be reflected plural times by the inner mirrors so as to make the distribution of the light uniform. The light tunnel 29 is disposed to enable the light (blue light and fluorescence) condensed by the refractive optical system 27 to be incident on the light tunnel 29. In the first embodiment, the light tunnel 29 is described as an example of the light mixing element. However, no limitation is intended thereby. Alternatively, the light tunnel 29 may be, for example, a rod integrator or a fly-eye lens.

Figure 16A:
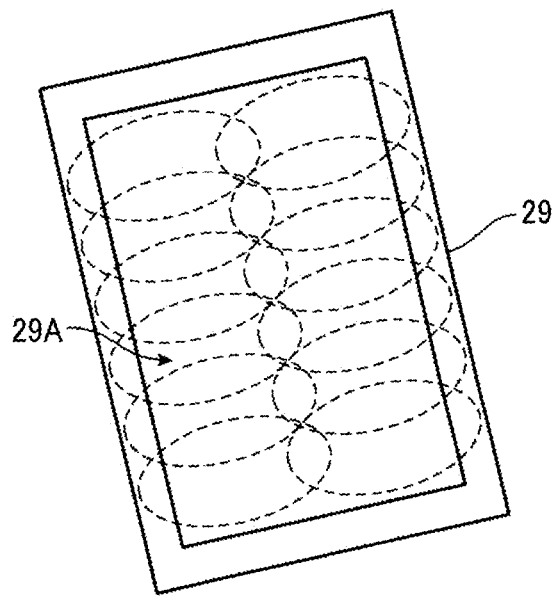
FIGS. 16A and 16B are illustrations of an incident aperture of a light tunnel in the light-source device according to the first embodiment, as viewed from the incident direction of light.
Figure 16B:
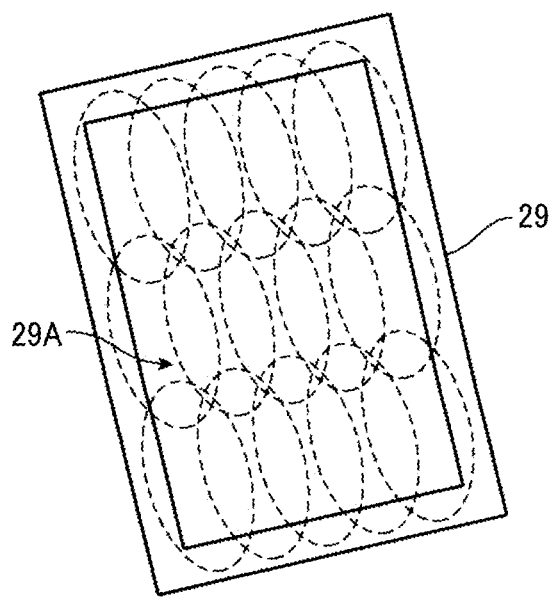

FIGS. 16A and 16B are illustrations of an incident aperture 29A of the light tunnel 29 in the light-source device 20 according to the first embodiment, as viewed from the incident direction of light. FIGS. 16A and 16B each indicates a projection range of the blue light projected onto the incident aperture 29A of the light tunnel 29. The light tunnel 29 is arranged slightly tilted as illustrated in FIGS. 16A and 16B. The tilt angle of the light tunnel is determined depending on a desired performance of the light-source device 20.

In the light source unit of the light-source device 20 according to the first embodiment, as described above, the laser sources 21 (laser diodes 21A) are arrayed. As illustrated in FIG. 16B, each projection range on the incident aperture 29A of the light tunnel has an elliptical shape, each projection range being a range in which the blue light or the like emitted from a laser diode 21A is projected onto the incident aperture 29A (see FIGS. 16B and 16C). For example, as illustrated in FIG. 16B, the projection ranges of the blue light or the like on the incident aperture 29A are arranged such that the major axis of the elliptical shape of each projection range is substantially parallel to the short side of the incident aperture 29A. With such an arrangement of the projection ranges of the blue light or the like on the incident aperture 29A, the occurrence of the vignetting of the blue light or the like in the light tunnel 29 can be prevented. For another example as illustrated in FIG. 16B, the projection ranges of the blue light or the like on the incident aperture 29A may be arranged such that the major axis of the elliptical shape of each projection range is substantially parallel to the long side of the incident aperture 29A. In the present embodiment, the elliptical shape refers to a shape having a difference between the full width at half maximum (FWHM) of the intensity distribution in the vertical direction of the projection range and the full width at half maximum (FWHM) of the intensity distribution in the horizontal direction. In other words, the elliptical shape is a shape without an isotropic intensity distribution.

A description is given below of the optical path of the blue light (hereinafter, referred to also as a blue light path) in the light-source device 20 with the above-described configuration, with reference to FIG. 11A. The blue light path is an optical path of some light rays of the excitation light emitted from the laser source 21, the some light rays to be reflected by the excitation-light reflective region 26E of the phosphor unit 26.

The blue light emitted from the laser source 21 is converted by the coupling lens 22 into parallel light. The blue light emitted from the coupling lens 22 is converged and combined by the large-diameter lens 23a of the first optical system 23, and then converted into parallel light (collimated light) by the negative lens 23b. The blue light emitted from the negative lens 23b is reflected by the first region 24A of the dichroic mirror 24 and travels to the second optical system 25. The first region 24A constitutes a reflecting surface 102a that reflects the blue light emitted from the laser source 21 (see FIG. 1A). The point P at the center of the projection image of the excitation light described above is formed in the first region 24A.

As described above, the first region 24A of the dichroic mirror 24 is disposed closer to the first optical system 23 relative to the optical axis of the second optical system 25. With this arrangement, the blue light path is caused to be incident on a portion of the second optical system 25 (more specifically, the positive lens 25A), the portion being on the first optical system 23 side. Then, the blue light advances so as to approach the optical axis of the second optical system 25 while forming an angle with respect to the optical axis of the second optical system 25, and is emitted from the second optical system 25 (more specifically, from the positive lens 25B). The blue light emitted from the second optical system 25 is incident on the phosphor unit 26.

In the present disclosure, it is assumed that the blue light incident on the phosphor unit 26 has been incident on the excitation-light reflective region 26E. The blue light incident on the excitation-light reflective region 26E is subjected to specular reflection. The blue light specularly reflected by the excitation-light reflective region 26E is then incident on a portion of the second optical system 25 (more specifically, the positive lens 25B), the portion being on the opposite side of the first optical system 23 side with respect to the optical axis of the second optical system 25. Then, the blue light travels away from the optical axis of the second optical system 25 while forming an angle with respect to the optical axis of the second optical system 25, and is emitted from the second optical system 25 (more specifically, the positive lens 25A).

Blue light emitted from the second optical system 25 (more specifically, the positive lens 25A) passes through the second region 24B of the dichroic mirror 24. The light flux of the blue light specularly reflected by the phosphor unit 26 or the light flux of the blue light emitted from the second optical system 25 and transmitted through the second region 24B of the dichroic mirror 24 constitutes the above-described light flux Q2 of the excitation light emitted from the phosphor unit 103. As described above, the second region 24B of the dichroic mirror 24 has an optical property that transmits the excitation light (and the fluorescence). With this configuration, a decrease in the utilization efficiency of light is substantially prevented even when the light flux (light flux Q2) of the blue light intersects with the dichroic mirror 24.

The blue light transmitted through the second region 24B of the dichroic mirror 24 is incident on the refractive optical system 27. Then, the blue light advances so as to approach the optical axis of the refractive optical system 27 while forming an angle with respect to the optical axis of the refractive optical system 27, and is incident on the light tunnel 29 through the color wheel 28. The blue light incident on the light tunnel 29 is reflected plural times thereinside and homogenized (made uniform), and is then incident upon the illumination optical system 30 outside the light-source device 20.

Next, the optical path of the fluorescence (hereinafter, appropriately referred to as a fluorescence light path) in the light-source device 20 is described according to the present embodiment with reference to FIG. 11B. In FIG. 11B, a part of the optical path of the fluorescence is omitted for convenience of explanation. The fluorescence light path is an optical path of some other light rays of the excitation light emitted from the laser source 21, the wavelength of the some other light rays to be converted by the fluorescent region 26D of the phosphor unit 26.

Until the blue light emitted from the laser source 21 is guided to the phosphor unit 26, the fluorescence light path is identical with the blue light path described above. In this case, it is assumed that the blue light incident on the phosphor unit 26 is incident on the fluorescent region 26D. The blue light incident on the fluorescent region 26D serves as excitation light and acts on the phosphor. The phosphor causes the conversion of the wavelength so that the fluorescence including, for example, a yellow wavelength band is generated and the fluorescence is reflected by the reflection coat 26D1 and the phosphor layer 26D2 to exhibit Lambertian reflectance.

The fluorescence Lambertian-reflected by the fluorescent region 26D is converted by the second optical system 25 into parallel light. The fluorescence emitted from the second optical system 25 passes through the dichroic mirror 24 and is incident on the refractive optical system 27. Then, the fluorescence advances so as to approach the optical axis of the refractive optical system 27 while forming an angle with respect to the optical axis of the refractive optical system 27, and is incident on the light tunnel 29 through the color wheel 28. The fluorescence incident on the light tunnel 29 is reflected plural times thereinside and homogenized (made uniform), and is then incident upon the illumination optical system 30 outside the light-source device 20.

As described above, in the light-source device 20 according to the first embodiment, the optical path of the blue light emitted from the laser source 21 differs between before and after the reflection by the phosphor unit 26. More specifically, the blue light path is formed so as to prevent the center (point P in FIG. 1A) of the projection image of the blue light projected from the laser source 21 onto the first region 24A of the dichroic mirror 24, from intersecting with the light flux (light flux Q2 in FIG. 1A) of the blue light reflected from the phosphor unit 26. With this configuration, the light flux of the blue light emitted from the phosphor unit 26 does not intersect with the center of the projection image of the blue light emitted from the laser source 21. This prevents these blue light beams from passing through the same location on the dichroic mirror 24, which further prevents damage on the dichroic mirror 24 due to an increase in the light condensing density. Thus, the reliability can be increased.

Further, in the present embodiment, particular optical elements such as a phase-contrast plate and a polarization splitter (polarization beam splitter) are not used to separate the optical path of the blue light emitted from the phosphor unit 26, from the other optical path. This configuration reduces the number of components and the cost for producing the light-source device 20, thus achieving a reduction in the size of the light-source device 20. Further, since optical components such as a phase-contrast plate and a polarization splitter are not used to operate the polarization of light, a decrease in the utilization efficiency of light due to the reflectivity, transparency, and absorptance of the optical components can be substantially prevented.

Further, in the light-source device 20 according to the first embodiment, the blue light emitted from the laser source 21 is a linearly polarized laser beam whose polarization direction is a specific direction. In light source unit, a plurality of laser sources 21 is arranged so that all the linearly polarized laser beams are oriented in the same direction. With such an arrangement, the directions of the linearly polarized laser beams emitted from the light source unit are made uniform. The direction of each linearly polarized laser beam is determined by the direction in which the light source unit is arranged. As illustrated in FIGS. 16A and 16B, if the light source unit is tilted according to the tilt of the light tunnel 29, the direction of each linearly polarized laser beam varies. In such a situation where the direction of the linearly polarized laser beams varies, if the polarization of light is controlled by using, for example, a polarization splitter, the utilization efficiency of light might decrease when the light passes through the polarization splitter. Since the polarization of light is not controlled in the light-source device 20 according to the first embodiment, the decrease in the utilization efficiency of light due to the tilt of the laser source 21 can be prevented.

Second Embodiment

Figure 17A:
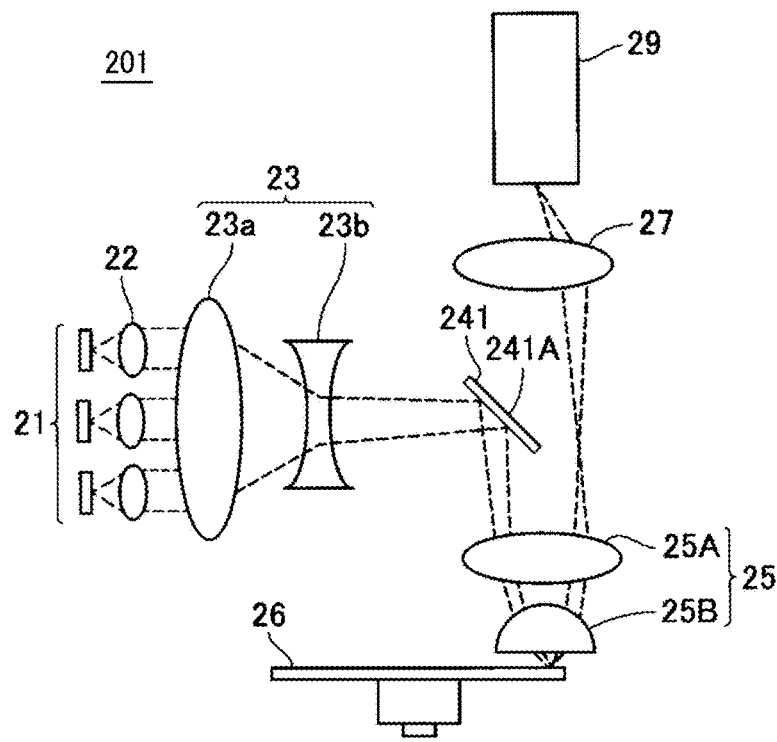
FIGS. 17A and 17B are schematic views of a configuration of a light-source device according to a second embodiment.
Figure 17B:
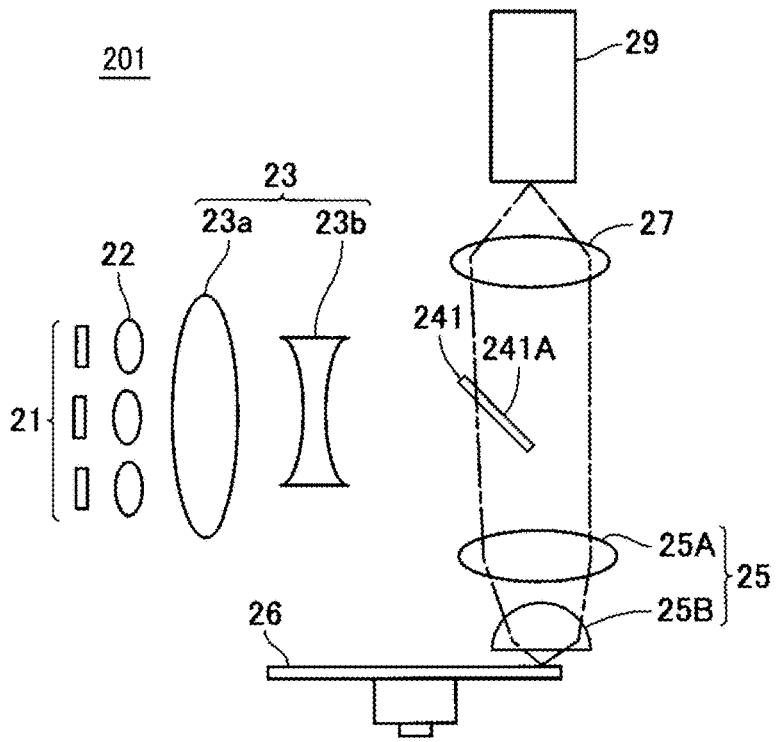

A light-source device 201 according to a second embodiment differs in the configuration of the dichroic mirror from the light-source device 20 according to the first embodiment. Hereinafter, the configuration of the light-source device 201 according to the second embodiment is described below, focusing on differences from the light-source device according to the first embodiment. FIGS. 17A and 17B are schematic views of a light-source device 201 according to the second embodiment. FIG. 17A indicates the optical path of the blue light in the light-source device 201, and FIG. 17B indicates the optical path of the fluorescence in the light-source device 201. In FIGS. 17A and 17B, the same reference numerals are given to the same components as those in FIGS. 11A and 11B, and the description thereof will be omitted. In FIG. 17B, a part of the optical path of the fluorescence is omitted for convenience of explanation.

As illustrated in FIGS. 17A and 17B, the light-source device 201 differs from the light-source device 20 according to the first embodiment in that the light-source device 201 includes a dichroic mirror 241. The dichroic mirror 241 is arranged to be tilted in the same manner as in the dichroic mirror 24. However, the dichroic mirror 241 has a shorter length than the dichroic mirror 24. Since the dichroic mirror 24 is configured to have a shorter length, the size of the light-source device 20 can be reduced. The dichroic mirror 241 has the same optical property for a part of the dichroic mirror 24 (the first region 24A).

Figure 18:
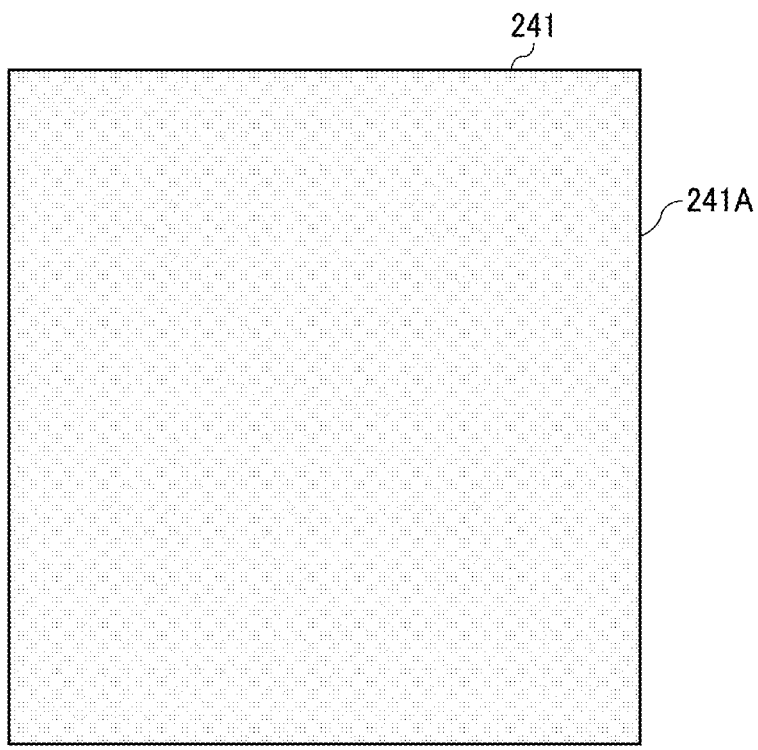
FIG. 18 is an illustration of an example of a configuration of a dichroic mirror in the light-source device according to the second embodiment.

FIG. 18 is an illustration of an example of the dichroic mirror 241 in the light-source device 201 according to the second embodiment. FIG. 18 indicates the dichroic mirror 241 as viewed from the incident direction of the blue light (excitation light) emitted from the first optical system 23 side. As illustrated in FIG. 18, the dichroic mirror 241 has only a region 241A.

Same as the first region 24A, the region 241A has the optical property that reflects the blue light emitted from the first optical system 23 (the negative lens 23b) while transmitting the fluorescence converted from the blue light by the phosphor of the phosphor unit 26. The region 241A is located at the same position as the first region 24A. In other words, the region 241A is disposed on the optical axis of the first optical system 23, but is not disposed on the optical axis of the second optical system 25. The region 241A is disposed closer to the first optical system 23 side relative to the optical axis of the second optical system 25.

A description is given below of the blue light path and the fluorescence light path in the light-source device 201 with the above-described configuration, with reference to FIG. 17A and FIG. 17B. As illustrated in FIG. 17A, the blue light emitted from the laser source is reflected by the excitation-light reflective region 26E of the phosphor unit 26 and emitted to the second optical system 25, which is the same as in the blue light path according to the first embodiment. In the light-source device 201 according to the second embodiment, unlike the first embodiment, the blue light emitted from the second optical system 25 does not pass through the dichroic mirror 241. The light flux (light flux Q2) of the blue light emitted from the phosphor unit 103 does not intersect with the dichroic mirror 24. The fluorescence light path is the same as in the first embodiment, as illustrated in FIG. 17B.

In the light-source device 201 according to the second embodiment, the optical path of the blue light emitted from the laser source 21 differs between before and after the reflection by the phosphor unit 26. Accordingly, same as the light-source device 20 according to the first embodiment, the configuration according to the second embodiment exhibits good reliability and achieves a reduction in size and cost.

Particularly, in the light-source device 201, the width of the dichroic mirror 241 can be smaller than the width of the second optical system 25. Accordingly, the size of the light-source device 201 can be reduced. Further, in the light-source device 201, the optical path of the blue light reflected by the phosphor unit 26 does not pass through the dichroic mirror 241. Accordingly, a decrease in the utilization efficiency of light due to the transparency of the dichroic mirror 241 can be substantially prevented.

Third Embodiment

A light-source device 202 according to a third embodiment differs from the light-source device 201 according to the second embodiment in the following points: 1) the light-source device 202 further includes another light source unit (hereinafter, referred to as a second light source unit) including a laser source 211 and coupling lenses 221, in addition to the light source unit (hereinafter, referred to as a first light source unit where appropriate) including the laser source 21 and the coupling lenses 22; and 2) the light-source device 202 further includes a polarization optical component that combines excitation light emitted from the second light source unit with the excitation light emitted from the first light source unit.

Figure 19A:
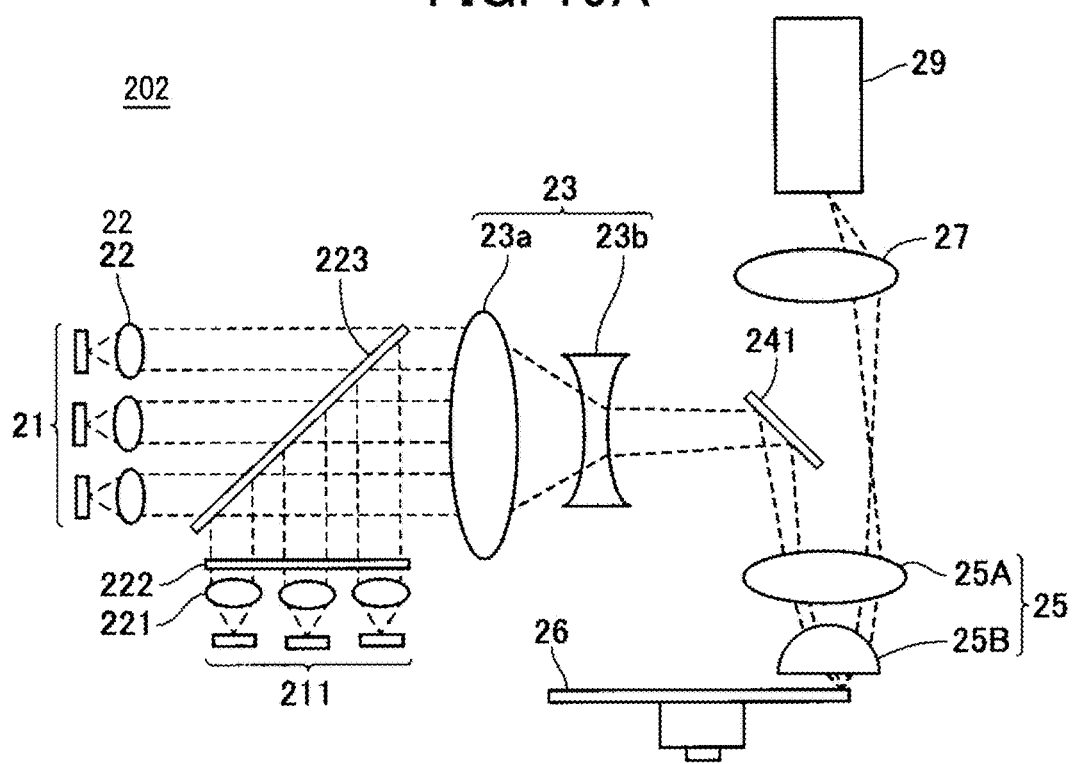
FIGS. 19A and 19B are schematic views of a light-source device according to a third embodiment.
Figure 19B:
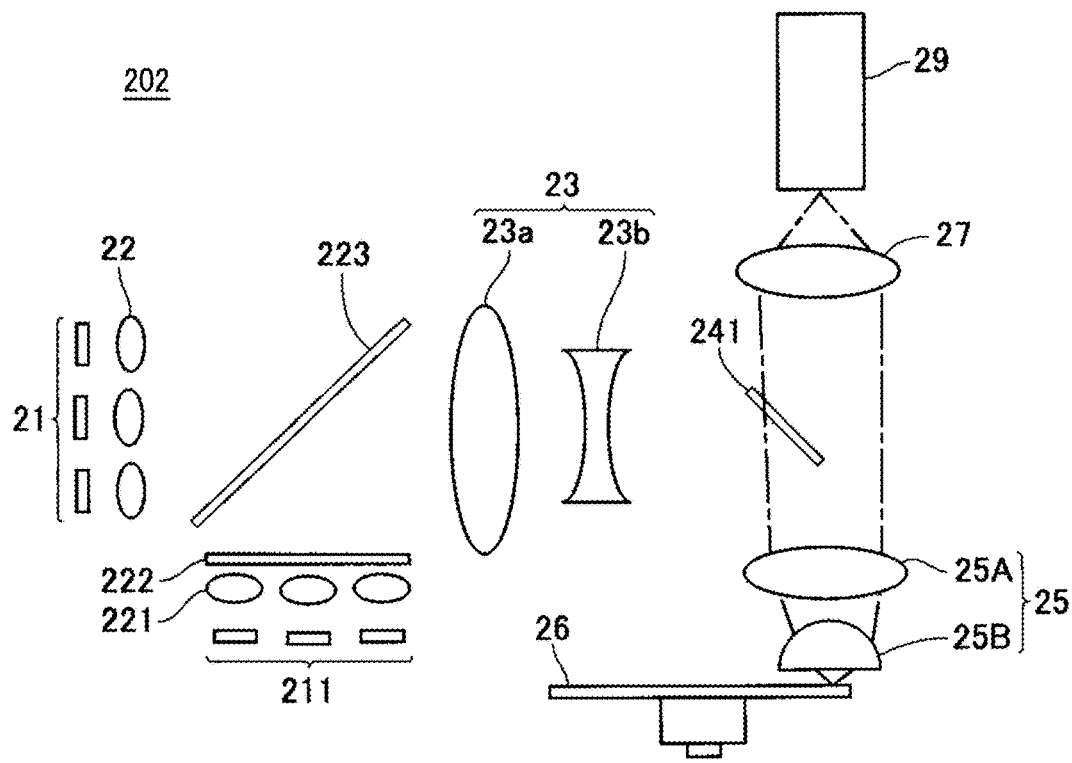

Hereinafter, the configuration of the light-source device 202 according to the third embodiment is described below, focusing on differences from the light-source device 201 according to the second embodiment. FIGS. 19A and 19B are schematic diagrams of the light-source device 202 according to the third embodiment. FIG. 19A indicates the optical path of the blue laser beam in the light-source device 202 according to the third embodiment, and FIG. 19B indicates the optical path of the fluorescence in the light-source device 202 according to the third embodiment. In FIGS. 19A and 19B, the same reference numerals are given to the same components as those in FIGS. 17A and 17B, and the description thereof will be omitted. In FIG. 19B, a part of the optical path of the fluorescence is omitted for convenience of explanation.

As illustrated in FIGS. 19A and 19B, the light-source device 202 includes a laser source 211 and coupling lenses 221, which constitute the second light source unit. The second light source unit is arranged so that the laser beams emitted from the laser source 211 are orthogonal to the laser beams emitted from the laser source 21 of the first light source unit.

The laser source 211 has the same configuration as the laser source 21. In other words, in the laser source 211, light sources (laser diodes) that emit a plurality of laser beams are arranged in array. The laser source 211 emits, for example, blue light in a blue band where the center wavelength of emission intensity is 455 nm. In this case, each of the laser sources 21 and 211 is configured to emit P-polarized light. In a similar manner to the coupling lens 22, the coupling lens 221 is a lens that receives blue light emitted from the laser source 211 and converts the blue light into parallel light (collimated light).

The light-source device 202 includes a half-wave retarder 222 and a polarization splitter 223 that constitute a polarization optical component. The half-wave retarder 222 is arranged to face the plurality of coupling lenses 221. The half-wave retarder 222 converts a P-polarized component of blue light emitted from the laser source 211 into an S-polarized component. The polarization splitter 223 is disposed in the optical path of the blue light emitted from the laser source 21 and the blue light emitted from the laser source 211. The polarization splitter 223 has an optical property that reflects the S-polarized component of the blue light while transmitting the P-polarized component of the blue light.

The P-polarized component of the blue light emitted from the laser source 21 passes through the polarization splitter 223 and is incident on the large-diameter lens 23a of the first optical system 23. After the P-polarized component of the blue light emitted from the laser source 211 is converted into the S-polarized light by the half-wave retarder 222, the S-polarized light is reflected by the polarization splitter 223 and is incident on the large-diameter lens 23a of the first optical system 23. Thus, the excitation light (blue light) from the second light source unit is combined with the excitation light (blue light) from the first light source unit.

The blue light path and the fluorescence light path in the light-source device 202 having such a configuration is described with reference to FIGS. 19A and 19B. As illustrated in FIGS. 19A and 19B, the blue light path and the fluorescence light path after being combined by the polarization splitter 223 and incident on the large-diameter lens 23a of the first optical system 23 are the same as those in the second embodiment.

In the light-source device 202 according to the third embodiment, the optical path of the blue light emitted from the laser source 21 differs between before and after the reflection of the phosphor unit 26. Accordingly, in the same manner as in the light-source device 201 according to the second embodiment, the configuration according to the third embodiment exhibits good reliability and achieves a reduction in size and cost. Particularly, in the light-source device 202, since the excitation light from the second light source unit is combined with the excitation light from the first light source unit, the luminance of the excitation light can be increased, and the utilization efficiency of light can be improved. Further, since the polarization is controlled by the half-wave retarder 222 and the polarization splitter 223 constituting the polarization optical component, the optical paths can be separated from and combined with each other regardless of the presence or absence of the polarization component of the light emitted from the light source.

Fourth Embodiment

A light-source device 203 according to a fourth embodiment differs from the light-source device 201 according to the second embodiment in that the light-source device 203 includes a phosphor unit 261 instead of the phosphor unit 26. Hereinafter, the configuration of the light-source device 203 according to the fourth embodiment is described below, focusing on differences from the light-source device 201 according to the second embodiment.

Figure 20A:
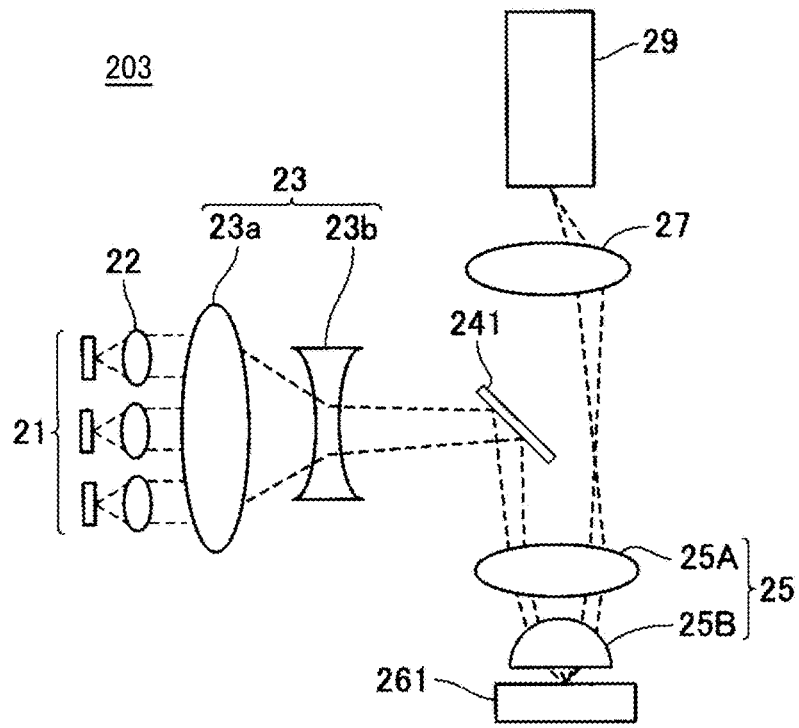
FIGS. 20A and 20B are schematic views of a light-source device according to the fourth embodiment.
Figure 20B:
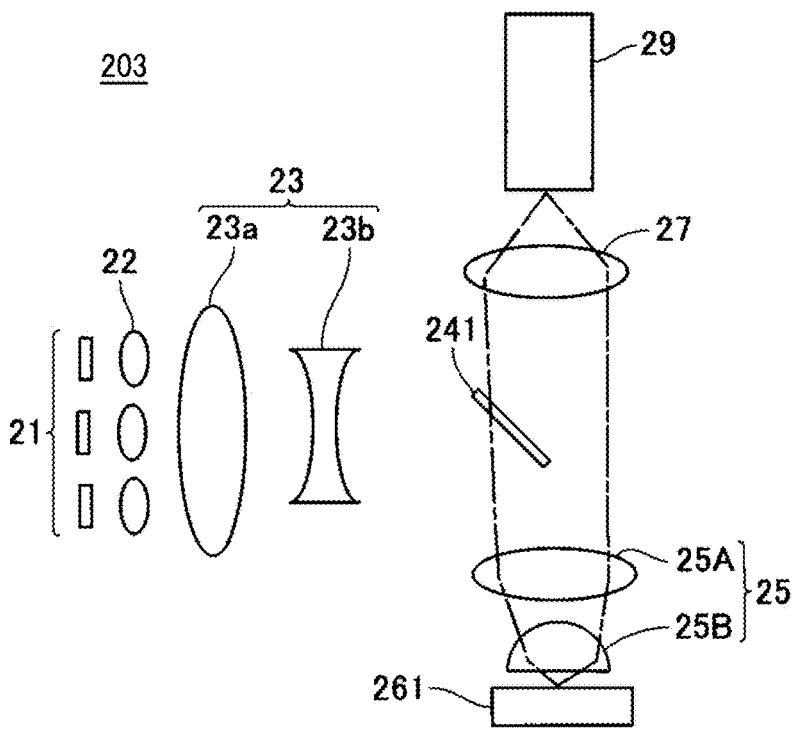

FIGS. 20A and 20B are schematic diagrams of a light-source device 203 according to the fourth embodiment. FIG. 20A indicates the optical path of the blue laser beam in the light-source device 203, and FIG. 20B indicates the optical path of the fluorescence in the light-source device 203. In FIGS. 20A and 20B, the same reference numerals are given to the same components as those in FIGS. 17A and 17B, and description thereof will be omitted. In FIG. 20B, a part of the optical path of the fluorescence is omitted for convenience of explanation.

The light-source device 203 according to the fourth embodiment includes a phosphor unit 261 (hereinafter, referred to as a stationary phosphor unit where appropriate) that is not driven to rotate, instead of the phosphor unit 26 that is driven to rotate. The stationary phosphor unit 261 reflects a portion of the blue light (excitation light) emitted from the laser source 21 with a change from the blue light. The stationary phosphor unit 261 converts the other portions of the blue light into fluorescence and emit the fluorescence.

Figure 21:
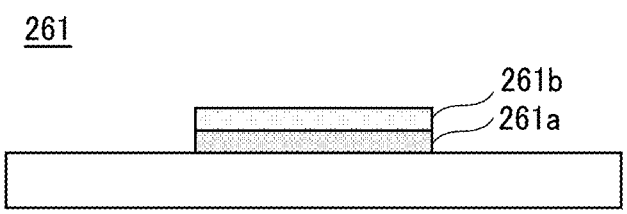
FIG. 21 is a schematic diagram of a phosphor unit in a light-source device according to a fourth embodiment.

FIG. 21 is a schematic diagram of the stationary phosphor unit 261 in the light-source device 203 according to the fourth embodiment. In FIG. 21, the stationary phosphor unit is viewed from a direction orthogonal to the incident direction of the blue light. As illustrated in FIG. 21, the stationary phosphor unit 261 is configured by stacking a phosphor 261b as the wavelength converting member on a reflection member 261a that reflects excitation light. For example, the reflection member 261a and the phosphor 261b have a rectangular shape in plan view. The phosphor 261b is applied on the reflection member 261a.

The phosphor 261b converts, for example, 80% of the incident blue light (excitation light) into fluorescence. Once the blue light is incident on the stationary phosphor unit 261, 80% of the blue light acts as excitation light for the phosphor 261b, and the phosphor 261b causes the conversion of the wavelength. As a result, the fluorescence including, for example, a yellow wavelength band where the center wavelength of emission intensity is 550 nm is generated, and the fluorescence is Lambertian-reflected by the phosphor 261b and the reflection member 261a.

Of the incident blue light (excitation light), for example, 20% of the blue light does not act as the excitation light and is reflected by the reflection member 261a. As a result, once the blue light is incident on the stationary phosphor unit 261, the blue light and the fluorescence are emitted from the stationary phosphor unit 261 simultaneously.

The blue light path and the fluorescence light path in the light-source device 203 having such a configuration is described with reference to FIGS. 20A and 20B. As illustrated in FIGS. 20A and 20B, the blue light path and the fluorescence light path in the light-source device 203 are the same as those in the second embodiment except for the wavelength conversion and reflection in the stationary phosphor unit 261.

In the light-source device 203 according to the fourth embodiment, the optical path of the blue light emitted from the laser source 21 differs between before and after the reflection of the phosphor unit 261. Accordingly, in the same manner as in the light-source device 201 according to the second embodiment, the configuration according to the fourth embodiment exhibits good reliability and achieves a reduction in size and cost. Particularly, in the light-source device 203, since the blue light and the fluorescence are emitted simultaneously by the stationary phosphor unit 261, there is no need to drive the phosphor unit to rotate, and the manufacturing cost of the device can be reduced. In addition, since the motor for rotational driving is not used, noise can be reduced and a decrease in reliability due to the life of the motor is prevented.

Fifth Embodiment

A light-source device 204 according to a fifth embodiment differs from the light-source device 201 according to the second embodiment in including a mirror instead of the dichroic mirror 241 and also in the arrangement of the elements disposed downstream of the first optical system 23. Hereinafter, the configuration of the light-source device 204 according to the fifth embodiment is described below, focusing on differences from the light-source device 201 according to the second embodiment.

Figure 22A:
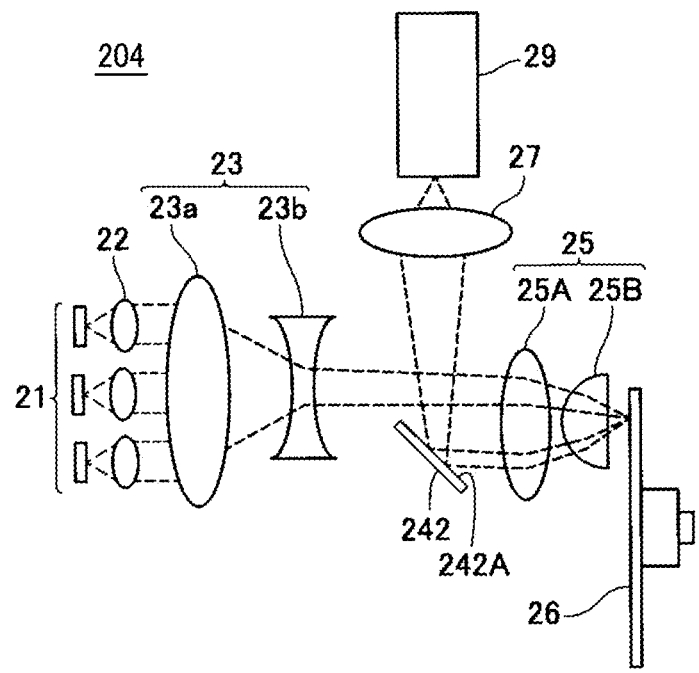
FIGS. 22A and 22B are schematic diagrams of a light-source device according to a fifth embodiment.
Figure 22B:
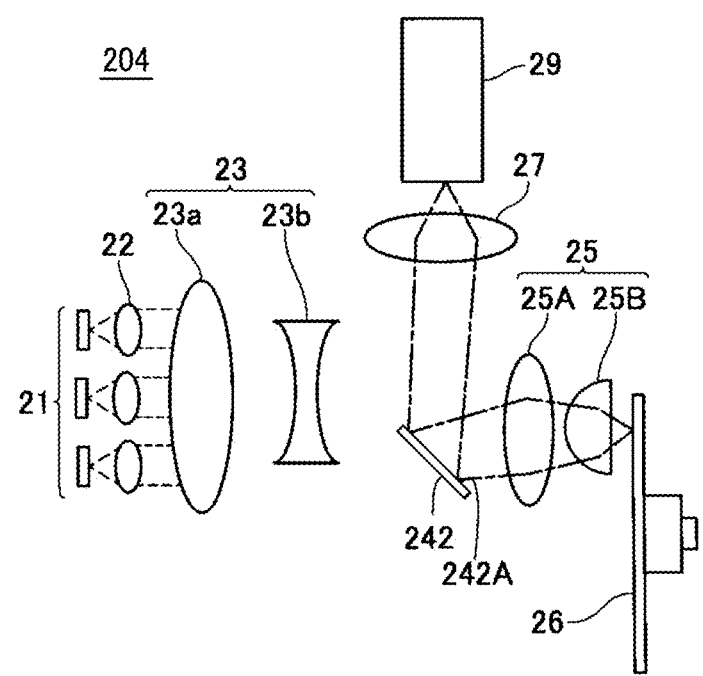

FIGS. 22A and 22B are schematic diagrams of the light-source device 204 according to the fifth embodiment. FIG. 22A indicates the optical path of the blue laser beam in the light-source device 204, and FIG. 22B indicates the optical path of the fluorescence in the light-source device 204. In FIGS. 22A and 22B, the same reference numerals are given to the same components as those in FIGS. 17A and 17B, and description thereof will be omitted. In FIG. 22B, a part of the optical path of the fluorescence is omitted for convenience of explanation.

As illustrated in FIG. 22A, the light-source device 204 includes a laser source (excitation light source) 21, a coupling lens 22, a first optical system 23, a second optical system 25, a phosphor unit 26, a mirror 242, a refractive optical system 27, a color wheel 28, and a light tunnel 29, which are sequentially arranged in the light propagation direction. In FIGS. 22A and 22B, the color wheel 28 is omitted for convenience of description. The color wheel 28 is described with reference to FIG. 10.

The mirror 242 is arranged to be tilted with respect to the propagation direction of the blue light emitted from the second optical system 25. More specifically, the mirror 242 is disposed with the front end portion tilted upward with respect to the propagation direction of the blue light emitted from the second optical system 25. The mirror 242 has an optical property that is capable of reflecting the blue light substantially collimated by the second optical system 25 while transmitting the fluorescence converted by the phosphor unit 26. For example, the mirror 242 is provided with a coat having the above-described optical property. The mirror 242 is misaligned from the optical axis of the positive lens 25A constituting the second optical system 25. The mirror 242 has a reflecting surface 242A on the surface facing the positive lens 25A.

The blue light path in the light-source device 204 having such a configuration is described with reference to FIG. 22A. The blue light path is an optical path of some light rays of the excitation light emitted from the laser source 21, the some light rays to be reflected by the excitation-light reflective region 26E of the phosphor unit 26.

The blue light emitted from the laser source 21 is converted by the coupling lens 22 into parallel light. The blue light emitted from the coupling lens 22 is converged and combined by the large-diameter lens 23a of the first optical system 23, and then converted into parallel light (collimated light) by the negative lens 23b. The blue light emitted from the negative lens 23b is caused to be incident on a portion of the second optical system 25 (more specifically, the positive lens 25A), the portion being on the refractive optical system side (the upper side in FIGS. 22A and 22B). Then, the blue light advances so as to approach the optical axis of the second optical system 25 while forming an angle with respect to the optical axis of the second optical system 25, and is emitted from the second optical system 25 (more specifically, from the positive lens 25B). The blue light emitted from the second optical system 25 is incident on the phosphor unit 26.

In the present disclosure, it is assumed that the blue light incident on the phosphor unit 26 has been incident on the excitation-light reflective region 26E. The blue light incident on the excitation-light reflective region 26E is subjected to specular reflection. The blue light specularly reflected by the excitation-light reflective region 26E is then incident on a portion of the second optical system 25 (more specifically, the positive lens 25B), the portion being on the opposite side (the lower side in FIGS. 22A and 22B) of the refractive optical system 27 side. Then, the blue light travels away from the optical axis of the second optical system 25 while forming an angle with respect to the optical axis of the second optical system 25, and is emitted from the second optical system 25 (more specifically, the positive lens 25A).

The blue light emitted from the second optical system 25 (more specifically, the positive lens 25A) is reflected by the reflecting surface 242A of the mirror 242 and is incident on the refractive optical system 27. Then, the blue light advances so as to approach the optical axis of the refractive optical system 27 while forming an angle with respect to the optical axis of the refractive optical system 27, and is incident on the light tunnel 29 through the color wheel 28. The blue light incident on the light tunnel 29 is reflected plural times thereinside and homogenized (made uniform), and is then incident upon the illumination optical system 30 outside the light-source device 20.

Next, the optical path of the fluorescence in the light-source device 204 is described according to the present embodiment with reference to FIG. 22B. The fluorescence light path is an optical path of some other light rays of the excitation light emitted from the laser source 21, the wavelength of the some other light rays to be converted by the fluorescent region 26D of the phosphor unit 26.

Until the blue light emitted from the laser source 21 is guided to the phosphor unit 26, the fluorescence light path is identical with the blue light path described above. In this case, it is assumed that the blue light incident on the phosphor unit 26 is incident on the fluorescent region 26D. The blue light incident on the fluorescent region 26D serves as excitation light and acts on the phosphor. The phosphor causes the conversion of the wavelength so that the fluorescence including, for example, a yellow wavelength band is generated and the fluorescence is reflected by the reflection coat 26D1 and the phosphor layer 26D2 to exhibit Lambertian reflectance.

The fluorescence Lambertian-reflected by the fluorescent region 26D is converted by the second optical system 25 into parallel light. The fluorescence emitted from the second optical system 25 is reflected by the reflecting surface 242A of the mirror 242 and is incident on the refractive optical system 27. Then, the fluorescence advances so as to approach the optical axis of the refractive optical system 27 while forming an angle with respect to the optical axis of the refractive optical system 27, and is incident on the light tunnel 29 through the color wheel 28. The fluorescence incident on the light tunnel 29 is reflected plural times thereinside and homogenized (made uniform), and is then incident upon the illumination optical system 30 outside the light-source device 20.

In the light-source device 204 according to the fifth embodiment, the optical path of the blue light emitted from the laser source 21 differs between before and after the reflection of the phosphor unit 26. Accordingly, in the same manner as in the light-source device 20 according to the first embodiment, the configuration according to the fifth embodiment exhibits good reliability and achieves a reduction in size and cost.

Sixth Embodiment

A light-source device 205 according to a sixth embodiment differs from the light-source device 204 according to the fifth embodiment in including a dichroic mirror in addition to the mirror 242. Hereinafter, the configuration of the light-source device 205 according to the sixth embodiment is described below, focusing on differences from the light-source device according to the fifth embodiment.

Figure 23A:
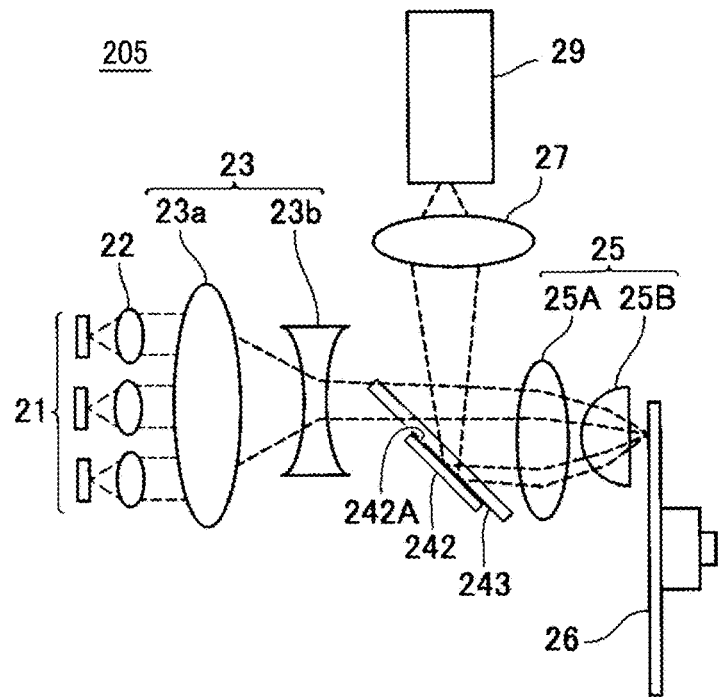
FIGS. 23A and 23B are schematic diagrams of a light-source device according to a sixth embodiment.
Figure 23B:
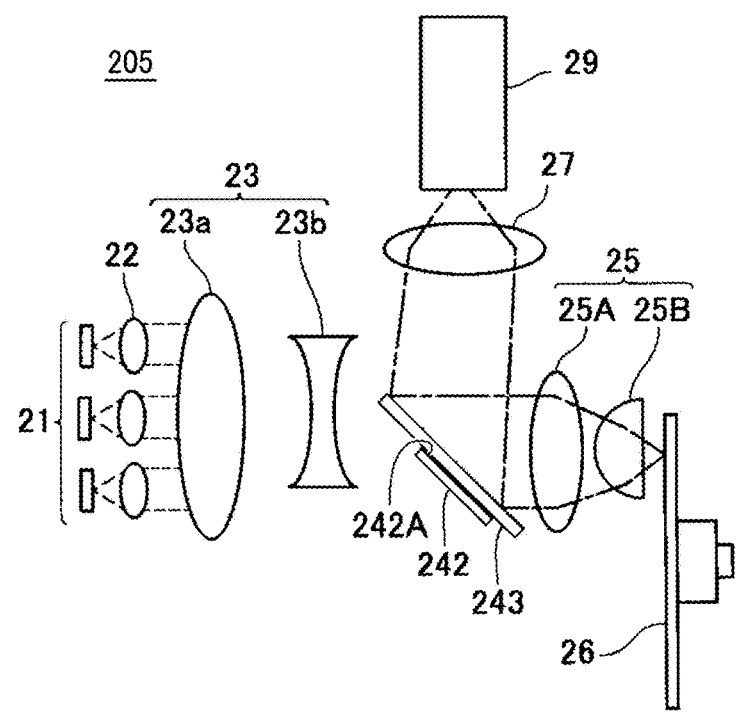

FIGS. 23A and 23B are schematic diagrams of a light-source device 205 according to a sixth embodiment. FIG. 23A indicates the optical path of the blue laser beam in the light-source device 205, and FIG. 23B indicates the optical path of the fluorescence in the light-source device 205. In FIGS. 23A and 23B, the same reference numerals are given to the same components as those in FIGS. 22A and 22BA, and description thereof will be omitted. In FIG. 23B, a part of the optical path of the fluorescence is omitted for convenience of explanation.

As illustrated in FIG. 23A, the light-source device 205 has a dichroic mirror 243 near the mirror 242. The dichroic mirror 243 has an optical property that is capable of reflecting the blue light substantially collimated by the second optical system 25 while transmitting the fluorescence converted by the phosphor unit 26. For example, the dichroic mirror 243 is provided with a coat having the above-described optical property. The dichroic mirror 243 is disposed on the reflecting surface 242A side of the mirror 242, in parallel with the mirror 242. In other words, in the same manner as the mirror 242, the dichroic mirror 243 is arranged obliquely with respect to the propagation direction of the blue light emitted from the second optical system 25. Preferably, the dichroic mirror 243 is disposed on the optical axis of second optical system 25. More preferably, the dichroic mirror 243 is disposed on the optical axis of the second optical system 25 and also on the optical axis of the refractive optical system 27.

The blue light path in the light-source device 205 having such a configuration is described with reference to FIG. 23A. The light-source device 205 according to the sixth embodiment differs from the light-source device 204 according to the fifth embodiment only in that the blue light beam emitted from the second optical system 25 is transmitted through the dichroic mirror 243 before being reflected by the reflecting surface 242A of the mirror 242 in the blue light path in the light-source device 205. For this reasons, description of the above-described functional units are omitted.

Next, the optical path of the fluorescence in the light-source device 205 is described according to the present embodiment with reference to FIG. 23B. After the blue light emitted from the laser source 21 is converted into the fluorescence and then converted into the parallel light by the second optical system 25, the fluorescent light path is the same as the light-source device 204 according to the fifth embodiment. In the light-source device 205, the fluorescence emitted from the second optical system 25 is reflected not by the mirror 242 but by the dichroic mirror 243, and is incident on the refractive optical system 27. Then, the fluorescence advances so as to approach the optical axis of the refractive optical system 27 while forming an angle with respect to the optical axis of the refractive optical system 27, and is incident on the light tunnel 29 through the color wheel 28. The fluorescence incident on the light tunnel 29 is reflected plural times thereinside and homogenized (made uniform), and is then incident upon the illumination optical system 30 outside the light-source device 20.

In the light-source device 205 according to the sixth embodiment, the optical path of the blue light emitted from the laser source 21 differs between before and after the reflection of the phosphor unit 26. Accordingly, in the same manner as in the light-source device 20 according to the first embodiment, the configuration according to the fifth embodiment exhibits good reliability and achieves a reduction in size and cost. Particular, in the light-source device 205, the dichroic mirror 243 is disposed on the optical axis of the second optical system 25 and also on the optical axis of the refractive optical system 27. This can improve the utilization efficiency of the fluorescence light.

Seventh Embodiment

A light-source device 206 according to a seventh embodiment differs from the light-source device 205 according to the sixth embodiment in the following points: 1) the light-source device 206 further includes another light source unit (the second light source unit) including a laser source 211 and coupling lenses 221, in addition to the light source unit (the first light source unit) including the laser source 21 and the coupling lenses 22; and 2) the light-source device 206 further includes a polarization optical component that combines excitation light emitted from the second light source unit with the excitation light emitted from the first light source unit. Hereinafter, the configuration of the light-source device 206 according to the seventh embodiment is described below, focusing on differences from the light-source device 205 according to the sixth embodiment.

Figure 24A:
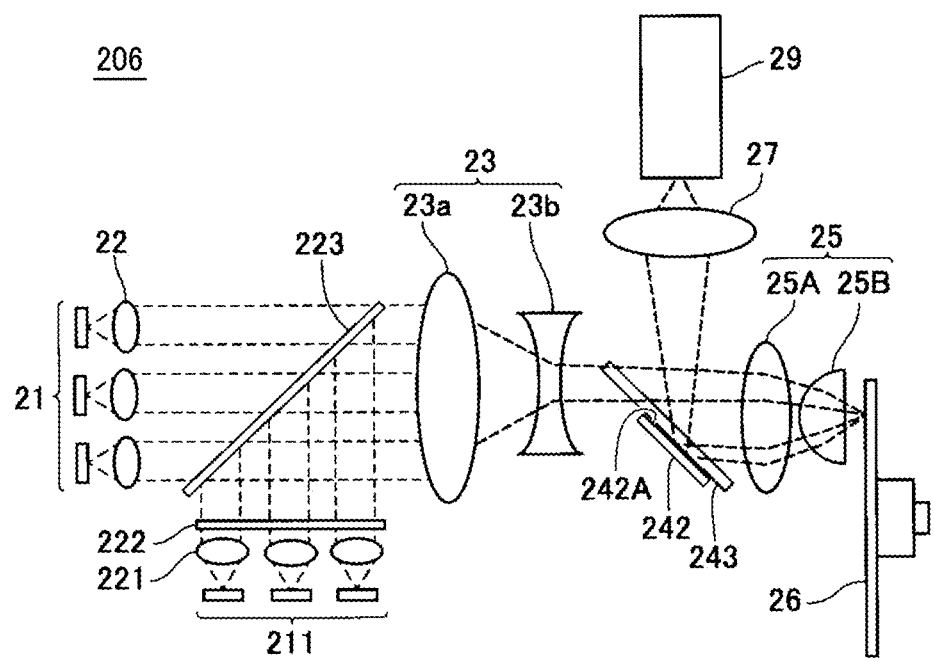
FIGS. 24A and 24B are schematic diagrams of a light-source device according to an eighth embodiment.
Figure 24B:
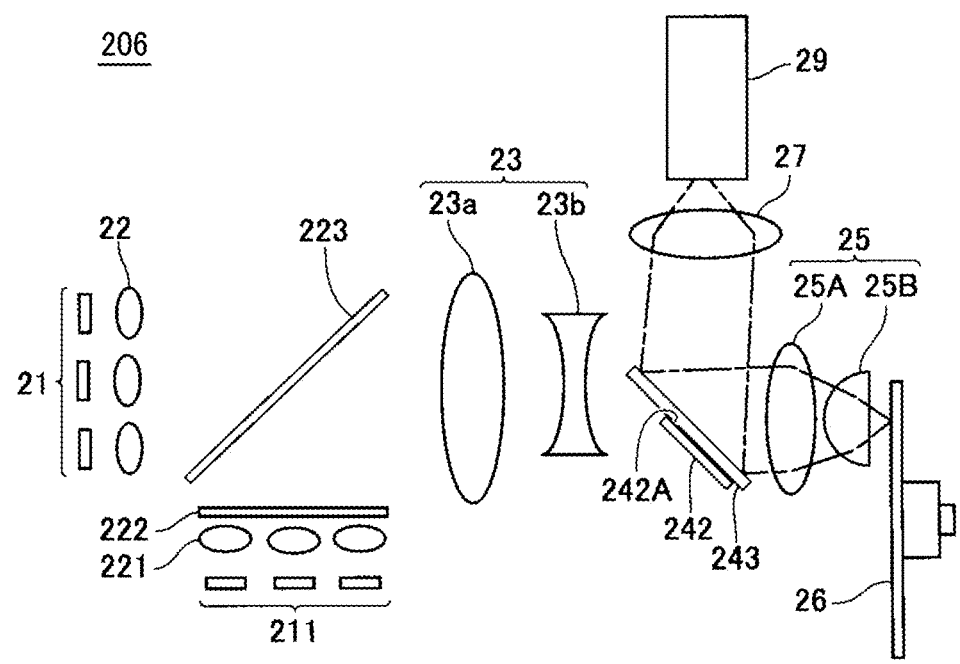

FIGS. 24A and 24B are schematic diagrams of the light-source device 206 according to the seventh embodiment. FIG. 24A indicates the optical path of the blue laser beam in the light-source device 206, and FIG. 24B indicates the optical path of the fluorescence in the light-source device 206. In FIGS. 24A and 24B, the same reference numerals are given to the same components as those in FIGS. 19A and 19B and FIGS. 23A and 23B, and description thereof will be omitted. In FIG. 24B, a part of the optical path of the fluorescence is omitted for convenience of explanation.

As illustrated in FIG. 24A, the light-source device 206 differs from the light-source device 205 according to the sixth embodiment in that the light-source device 206 includes a laser source 211 and a coupling lenses 221 constituting a second light source unit, and in that the light-source device 206 includes a half-wave retarder 222 and a polarization splitter 223 constituting the polarization optical component. For the configurations of the second light source unit, the half-wave retarder 222, and the polarization splitter 223, refer to the description of the light-source device 202 according to the third embodiment in FIGS. 19A and 19B.

The blue light path in the light-source device 206 having such a configuration is described with reference to FIG. 24A. As illustrated in FIG. 24A, the blue light path from the laser source 21 and the laser source 211 to the first optical system 23 is the same as that of the light-source device 202 according to the third embodiment (see FIG. 19A). The blue light path from the first optical system 23 to the light tunnel 29 is the same as that of the light-source device 205 according to the sixth embodiment (see FIG. 23A). For this reasons, description of the above-described functional units are omitted.

Next, the optical path of the fluorescence in the light-source device 206 is described according to the present embodiment with reference to FIG. 24B. In the light-source device 206, the fluorescence light path from the laser source 21 and the laser source 211 to the first optical system 23 is the same as in the light-source device 202 according to the third embodiment. The fluorescence light path from the first optical system 23 to the light tunnel is the same as in the light-source device 205 according to the sixth embodiment (see FIG. 23A). For this reasons, description of the above-described functional units are omitted.

In the light-source device 206 according to the seventh embodiment, the optical path of the blue light emitted from the laser source 21 differs between before and after the reflection of the phosphor unit 26. Accordingly, in the same manner as in the light-source device 20 according to the first embodiment, the configuration according to the first embodiment exhibits good reliability and achieves a reduction in size and cost. Particularly, in the light-source device 206, since the excitation light from the second light source unit is combined with the excitation light from the first light source unit, the luminance of the excitation light can be increased, and the utilization efficiency of light can be improved. Further, since the polarization is controlled by the half-wave retarder 222 and the polarization splitter 223 constituting the polarization optical component, the optical paths can be separated from and combined with each other regardless of the presence or absence of the polarization component of the light emitted from the light source.

Eighth Embodiment

A light-source device 207 according to an eight embodiment differs from the light-source device 204 according to the fifth embodiment in that the light-source device 207 includes a phosphor unit (stationary phosphor unit) that is not driven to rotate, instead of the phosphor unit 26 that is driven to rotates. Hereinafter, the configuration of the light-source device 207 according to the eighth embodiment is described below, focusing on differences from the light-source device 204 according to the fifth embodiment.

Figure 25A:
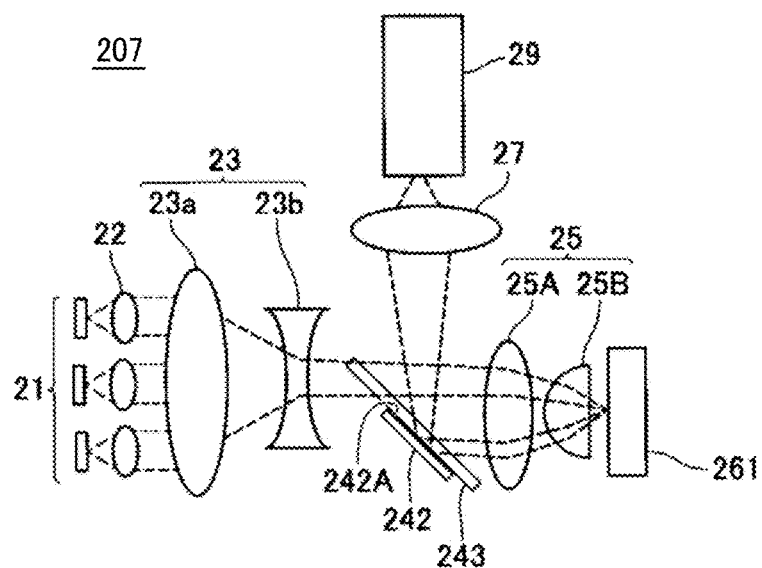
FIGS. 25A and 25B are schematic diagrams of a light-source device according to an eighth embodiment.
Figure 25B:
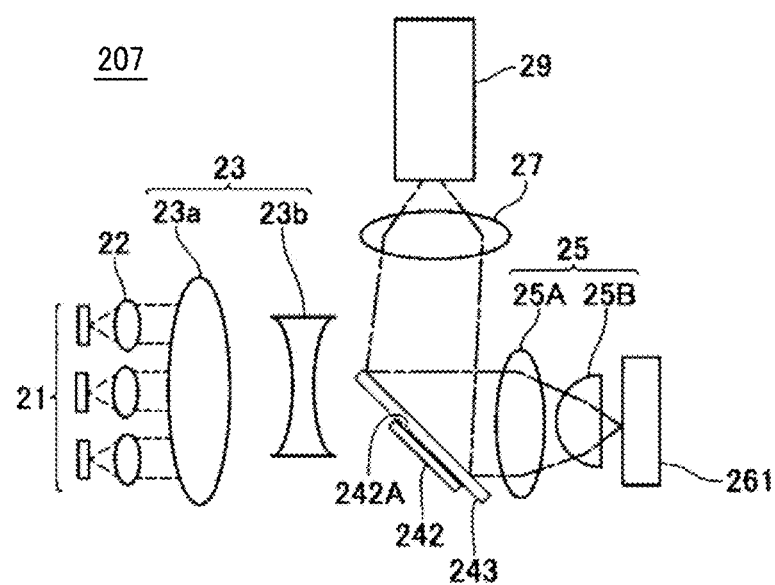

FIGS. 25A and 25B are schematic diagrams of a light-source device 207 according to the eighth embodiment. FIG. 25A illustrates the optical path of the blue laser beam in the light-source device 207, and FIG. 25B illustrates the optical path of the fluorescence light in the light-source device 207. In FIGS. 25A and 25B, the same reference numerals are given to the same components as those in FIGS. 20A and 20B and FIGS. 23A and 23B, and description thereof will be omitted. In FIG. 25B, a part of the optical path of the fluorescence is omitted for convenience of explanation.

As illustrated in FIG. 25A, the light-source device 207 according to the eighth embodiment differs from the light-source device 204 according to the fifth embodiment in that the light-source device 207 includes a phosphor unit (stationary phosphor unit) 261 that is not driven to rotate, instead of the phosphor unit 26 that is driven to rotate. For the configurations of the stationary phosphor unit 261, refer to the description of the light-source device 203 according to the fourth embodiment in FIGS. 20A and 20B.

The blue light path in the light-source device 207 having such a configuration is described with reference to FIG. 25A. As illustrated in FIG. 25A, the blue light path from the laser source 21 to the stationary phosphor unit 261 is the same as that of the light-source device 205 according to the sixth embodiment. The blue light path from the stationary phosphor unit 261 to the light tunnel 29 is the same as that of the light-source device 205 according to the sixth embodiment. For this reasons, description of the above-described functional units are omitted.

Next, the optical path of the fluorescence in the light-source device 207 is described according to the present embodiment with reference to FIG. 24B. The fluorescence light path from the laser source 21 to the stationary phosphor unit 261 in the light-source device is the same as that of the light-source device 205 according to the sixth embodiment. The fluorescence light path from the stationary phosphor unit 261 to the light tunnel 29 is the same as that of the light-source device 205 according to the sixth embodiment. For this reasons, description of the above-described functional units are omitted.

In the light-source device 207 according to the eighth embodiment, the optical path of the blue light emitted from the laser source 21 differs between before and after the reflection of the phosphor unit 261. Accordingly, in the same manner as in the light-source device 20 according to the first embodiment, the configuration according to the fourth embodiment exhibits good reliability and achieves a reduction in size and cost. Particularly, in the light-source device 207, since the blue light and the fluorescence are emitted simultaneously by the stationary phosphor unit 261, there is no need to drive the phosphor unit to rotate, and the manufacturing cost of the device can be reduced. In addition, since the motor for rotational driving is not used, noise can be reduced and a decrease in reliability due to the life of the motor is prevented.

Ninth Embodiment

Figure 26A:
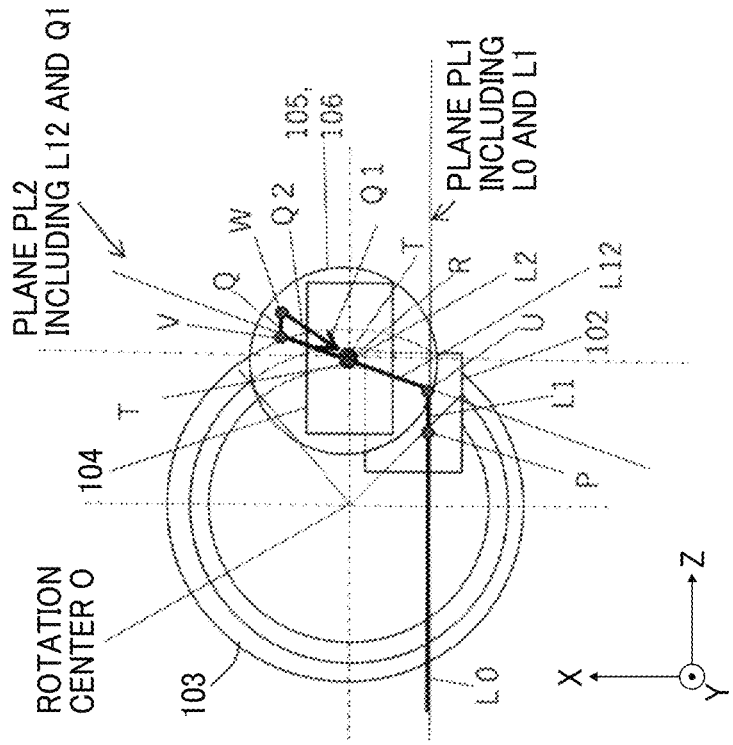
FIGS. 26A and 26B are schematic diagrams of a light-source device according to a ninth embodiment.
Figure 26B:
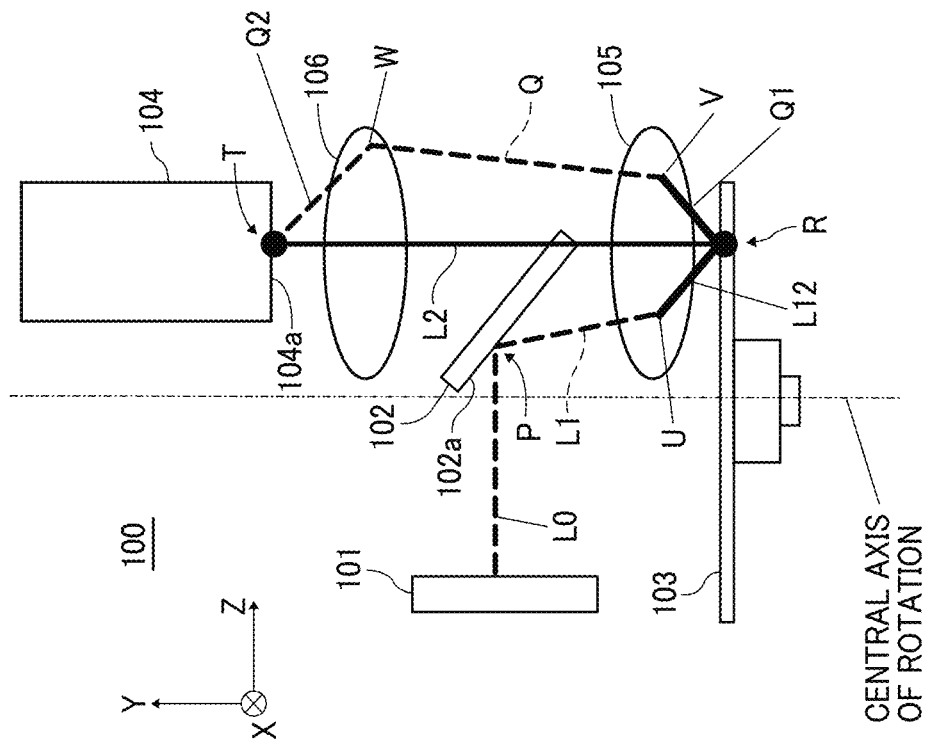

FIGS. 26A and 26B are schematic diagrams of a light-source device 100 according to the ninth embodiment. The basic configuration of the light-source device 100 of FIG. 26A is the same as the configuration of FIG. 5A. FIG. 26B is a plan view of the light-source device seen from an axial direction corresponding to the vertical direction in FIG. 26A.

The light-source device 100 according to the ninth embodiment has a configuration in which a longer side LE of an incident aperture 104a of a rod integrator 104 is parallel to a plane including straight lines L0 and L1 (i.e., a plane PL1 including the straight line L0 and the straight line L1) to be described later. As described above, a feature of an embodiment of the present disclosure is that a plane including the optical path of excitation light incident on an optical element and the optical path of excitation light reflected by the optical element toward a light condensing element (the optical path before and after the optical element) is not parallel to a plane including the optical path of excitation light between the light condensing element and a wavelength conversion unit (i.e., the optical path upstream and downstream from the wavelength conversion unit). In this regard, in FIG. 5A, the plane including the straight line L1 and the straight line L2 is "in the plane including the surface of the drawing sheet in which FIG. 5A is drawn". In other words, "the straight line L2 intersects with the extension line of the straight line L1". In contrast, in the ninth embodiment, the extension line of the straight line L1 does not intersect with the straight line L2.

Reference codes illustrated in FIGS. 26A and 26B are described below. L0 denotes an optical path (straight line) from the substantially central portion of the light flux emitted from a light source 101 to a point P. L1 denotes an optical path (straight line) connecting the center of a projection image on an incident surface 105a of a condenser lens 105, onto which excitation light incident on the condenser lens 105 is projected, and the point P on a reflecting surface 102a. L12 denotes an optical path (straight line) along which a light ray passing through a substantially central point of a light ray flux forming a projection image on the incident surface 105a of the condenser lens 105 exits from an exit surface 105b of the condenser lens 105 and travels toward a reflection point R. Q denotes a light flux of excitation light emitted from the phosphor unit 103. Q1 denotes an optical path that is reflected at the reflection point R and travels toward the condenser lens 105. Q2 denotes an optical path that is refracted by the refractive lens 106 and travels toward a point T at which light is incident on the rod integrator 104. The optical paths Q1 and Q2 are optical paths each representing a central light ray of the light flux and are also referred to as light rays Q1 and Q2, respectively. The central light ray of the light flux Q may also be referred to as a light ray Q, assuming that the central light ray is a representative light lay of the light flux Q. In addition, Q, Q1 and Q2 may also be referred to as a light flux Q, a light flux Q1, and a light flux Q2 by being regarded as light fluxes including the light rays Q, Q1, and Q2. U denotes an imaginary intersection of the light ray L1 and the light ray L12. V denotes an imaginary intersection of the light ray Q1 and the light ray Q. W denotes an imaginary intersection of the light ray Q and the light ray Q2.

Figure 29A:
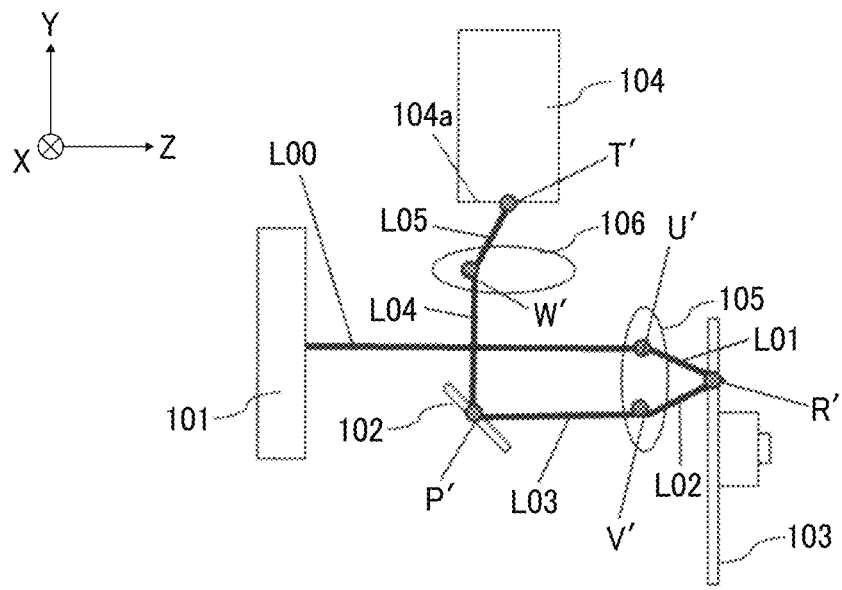
FIGS. 29A, 29B, and 29C are schematic diagrams of a phosphor unit in a light-source device according to a twelfth embodiment.
Figure 29B:
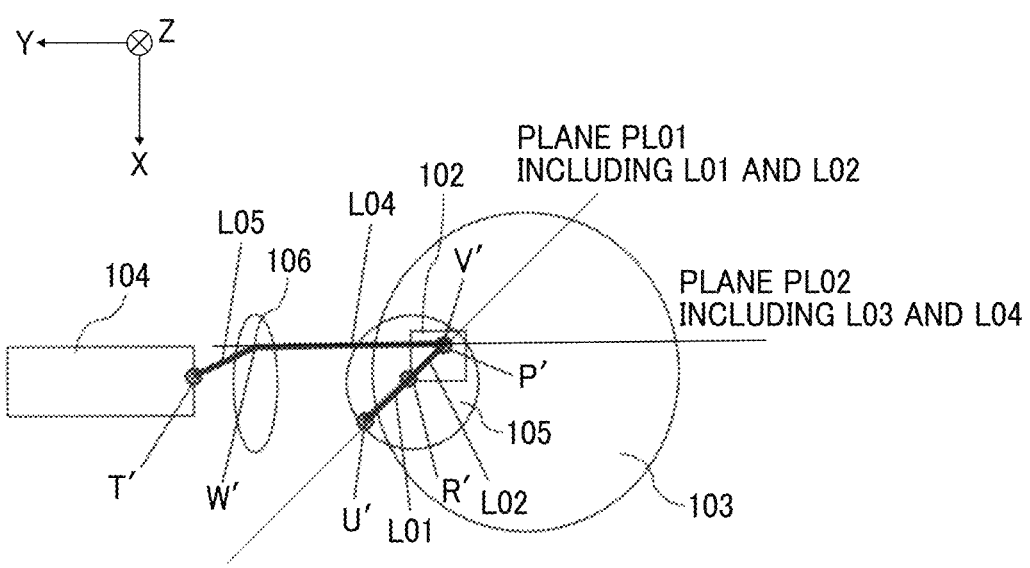

In order to clarify the three-dimensional positional relationship, the direction in which light is incident on the reflecting surface 102a is defined as the Z-axis, and the X, Y and Z coordinate axes of the right-handed system are defined as illustrated in the FIGS. 29A and 29B. FIG. 26A is a diagram of the YZ plane viewed from the minus side of the X-axis. FIG. 26B is a diagram of the state of FIG. 26A viewed from the side of the rod integrator 104, in other words, a diagram of the ZX plane viewed from the plus side of the Y-axis.

As illustrated in FIGS. 26A and 26B, the light ray emitted from the light source 101 is directed to a dichroic mirror 102 directly or after being folded (directly in FIG. 26A), and the light ray incident on the dichroic mirror 102 travels along a straight line L0. The straight line L0 itself may be regarded as a light ray. It is assumed that the light emitted from the light source 101 is treated as a "flux of light rays traveling with a constant width or discretely", and the "optical path substantially at the center of the flux of light rays" is defined as the straight line L0. The light source includes a single light emitting portion or a plurality of light emitting portions arranged in array on a certain surface, and the optical path of the center is the straight line L0 as the center of the single light emitting portion or a substantially center of the plurality of light emitting portions arranged in array. The straight line L0 is not limited to the center of the light-emitting portion or the light-emitting portion group, and is assumed to be the optical path of the substantially center of the flux of light rays. The light ray traveling along the straight line L0 is reflected at the point P, is incident on the condenser lens 105, and travels to the point R by the refraction action of the condenser lens 105. At this time, the point R on the phosphor unit 103 is a reflection region, and the light ray Q1 is specularly reflected at the point R and travels toward the condenser lens 105 again. The light flux Q1 is refracted by the refraction action of the condenser lens 105 to become the light flux Q. The light flux Q is refracted by the condensing action of the refractive lens 106 to become the light flux Q2, which travels toward the point T.

Originally, the light ray passing through the condenser lens 105 is refracted at the boundary of the lens and travels toward the point R (in this example, condensing point). However, in FIG. 29A, the light ray is illustrated as being refracted at a point U inside the condenser lens 105. This is for the purpose of simplifying the explanation in order to correctly convey the features of the present embodiment, and actually, the light is refracted when passing through the lens interfaces (for example, the incident surface 105a or the exit surface 105b in FIG. 3). The same applies to the bending point V at which the light ray Q1 reflected at the point R is refracted to become the light ray Q, and the same applies to the bending point W at which the light ray Q is refracted by the refractive action of the refractive lens 106 to become the light ray Q2.

In the light-source device 100 of the ninth embodiment, as illustrated in FIG. 26B, the plane PL1 including the straight line L0 and the straight line L1 and the plane PL2 including the straight line L12 and the light flux (light ray) Q1 are "not in a parallel relationship (are not parallel to each other)". Further, a straight line (an extension of the straight line L1) including a light ray traveling straight along the straight line L1 does not intersect with the straight line L2 (perpendicular to the point R) due to the refractive power of the condenser lens 105. In the light-source device 100 of the ninth embodiment, the longer side LE of the incident aperture 104a of the rod integrator 104 is parallel to the plane PL1 including the straight line L0 and the straight line L1.

Tenth Embodiment

Figure 27:
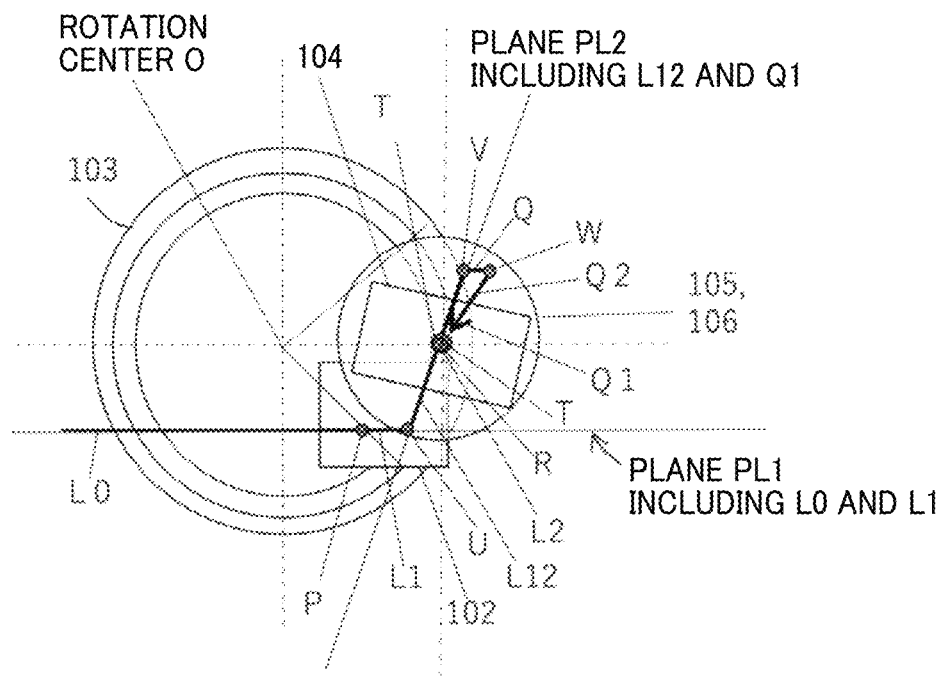
FIG. 27 is a schematic diagram of a phosphor unit in a light-source device according to a tenth embodiment.

FIG. 27 is a schematic diagram of a light-source device 100 according to a tenth embodiment. The light-source device 100 according to the tenth embodiment illustrated in FIG. 27 is a modification of the light-source device 100 according to the ninth embodiment illustrated in FIGS. 26A and 26B. The light-source device 100 according to the tenth embodiment of FIG. 27 is different from the light-source device 100 according to the ninth embodiment of FIGS. 26A and 26B in that the longer side LE of the incident aperture 104a of the rod integrator 104 is slightly rotated clockwise with respect to the plane PL1 including the straight line L0 and the straight line L1. In other respects, the light-source device 100 according to the tenth embodiment of FIG. 27 is the same as the light-source device 100 according to the ninth embodiment of FIGS. 26A and 26B.

Eleventh Embodiment

Figure 28:
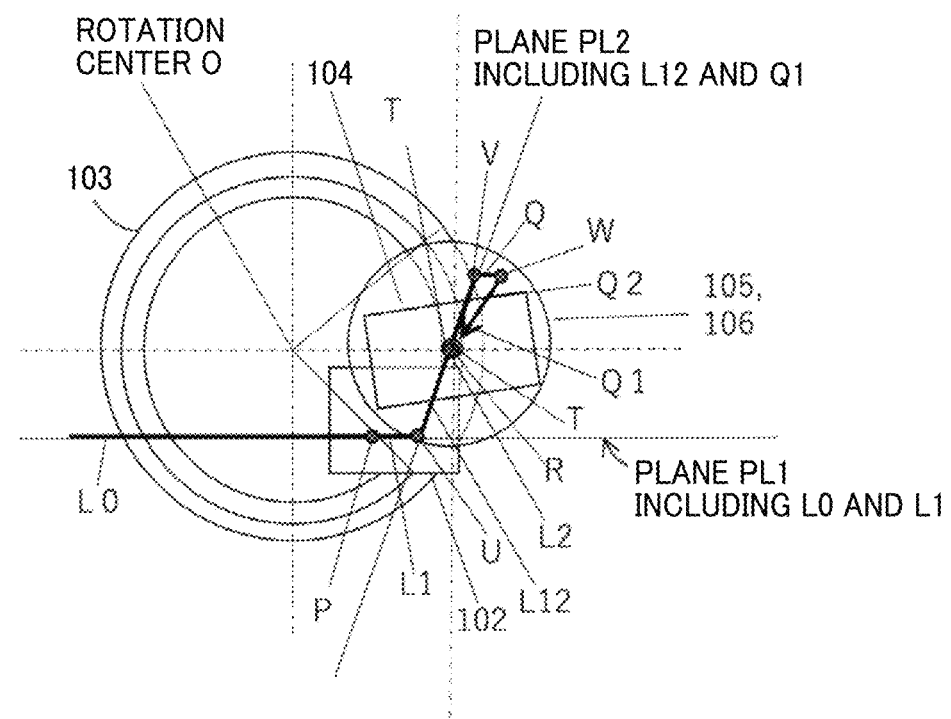
FIG. 28 is a schematic diagram of a phosphor unit in a light-source device according to an eleventh embodiment.

FIG. 28 is a schematic diagram of a light-source device 100 according to an eleventh embodiment. The light-source device 100 according to the eleventh embodiment illustrated in FIG. 28 is a modification of the light-source device 100 according to the ninth embodiment illustrated in FIGS. 26A and 26B. The light-source device 100 according to the eleventh embodiment of FIG. 28 is different from the light-source device 100 according to the ninth embodiment of FIGS. 26A and 26B in that the longer side LE of the incident aperture 104a of the rod integrator 104 is slightly rotated counterclockwise with respect to the plane PL1 including the straight line L0 and the straight line L1. In other respects, the light-source device 100 according to the eleventh embodiment of FIG. 28 is the same as the light-source device 100 according to the ninth embodiment of FIGS. 26A and 26B.

In both the tenth embodiment and the eleventh embodiment, as is clear from FIGS. 27 and 28, the longer side LE of the incident aperture 104a of the rod integrator 104 is "nearly parallel" to the plane PL1 including the straight line L0 and the straight line L1. Accordingly, most of the incident light on the rod integrator 104 enters the longer side LE of the incident aperture 104a of the rod integrator 104. The light-source devices 100 according to the ninth to eleventh embodiments are also characterized in that the light source unit and the phosphor unit 103 are arranged so that the central axis of rotation of the phosphor unit 103 does not intersect with the light ray L0.

Here, the light emitted from the light source 101 is regarded as a flux of light rays traveling with a constant width or discretely. However, the optical path at the substantial center of the flux of light rays is defined as the straight line L0. Since the flux of light rays has a constant width (thickness), an off-center end may intersect the central axis of rotation. In the present disclosure, regarding the light emitted from the light source 101, an optical path (straight line) along a light ray (optical path) substantially at the center of a flux of light rays that travels with a constant width or discretely is referred to as L0 or L1.

In FIG. 26 (26B), FIG. 27, and FIG. 28, the state in which the central axis of rotation of the phosphor unit 103 and the light ray L0 do not intersect with each other is exaggerated.

With such a configuration, since the excitation light or the like can be incident so as to strike the inner side surface corresponding to the long side of the incident aperture 104a of the rod integrator 104, the excitation light or the like can be made uniform as the number of reflections of the excitation light or the like inside the rod integrator 104 increases, and the occurrence of color unevenness in the excitation light or the like can be restrained.

In addition, in the tenth embodiment and the eleventh embodiment, in a case in which a straight line connecting the point R and the center of the projection image on the incident aperture 104a of the rod integrator 104 onto which the first color light is projected is defined as the straight line L2, a plane including the straight line L1 and the straight line L2 is not parallel to the direction of the shorter side SE (predetermined axial direction) of the incident aperture 104a of the rod integrator 104. In other words, the rod integrator 104 is rotated about the straight line L2. Such a configuration can further increase the number of times of reflection on the internal reflecting surfaces of the rod integrator 104, and thus a great effect can be obtained in uniformization.

In particular, in the tenth embodiment illustrated in FIG. 27, a large number of rays of the excitation light reaching the rod integrator 104 easily hit the internal reflection region located on the longer side LE of the rod integrator 104. In other words, it can also be seen that as the width of the flux of light rays of the excitation light increases, the tenth embodiment of FIG. 27 has a wider internal reflection region located on the longer side LE than the eleventh embodiment of FIG. 28. Thus, under certain conditions, the tenth embodiment of FIG. 27 is preferred over the eleventh embodiment of FIG. 28.

On the other hand, if the layout is adopted such that the plane PL1 and the plane PL2 are parallel to each other, the light is incident from the shorter side SE of the rod integrator, which makes it difficult to achieve uniformity. Therefore, the plane PL1 and the plane PL2 are not parallel to each other and have a positional relationship of preferably greater than 45 degrees and smaller than 135 degrees, in other words, approximately 90 degrees (in other words, is in a predetermined angular range based on the orthogonal position). Accordingly, for example, in a case in which the plane PL1 and "the direction of the longer side LE of the rod integrator 104" are aligned, the incident direction of the excitation light can be deflected by substantially 90 degrees without changing the arrangement of the rod integrator 104. Thus, many light rays can be guided to the internal reflection region located on the longer side LE of the rod integrator 104. Accordingly, it is effective in uniformization. Even if the angle formed by the plane PL1 and the plane PL2 is small, the small angle, in other word, the plane PL1 and the plane PL2 not being parallel with each other allows the optical path to be bent in the angled direction, thus causing an effect in downsizing the device.

Further, in order to further reduce the volume of the device, a larger effect can be obtained by appropriately setting the angle formed by the plane PL1 and the plane PL2. As described above, the angle formed by the plane PL1 and the plane PL2 is set to about 90 degrees (at least a range of more than 45 degrees and less than 135 degrees that is a predetermined angular range based on the orthogonal position), the optical path can be bent more cubically, thus allowing the optical system to be compact.

Twelfth Embodiment

Figure 29C:
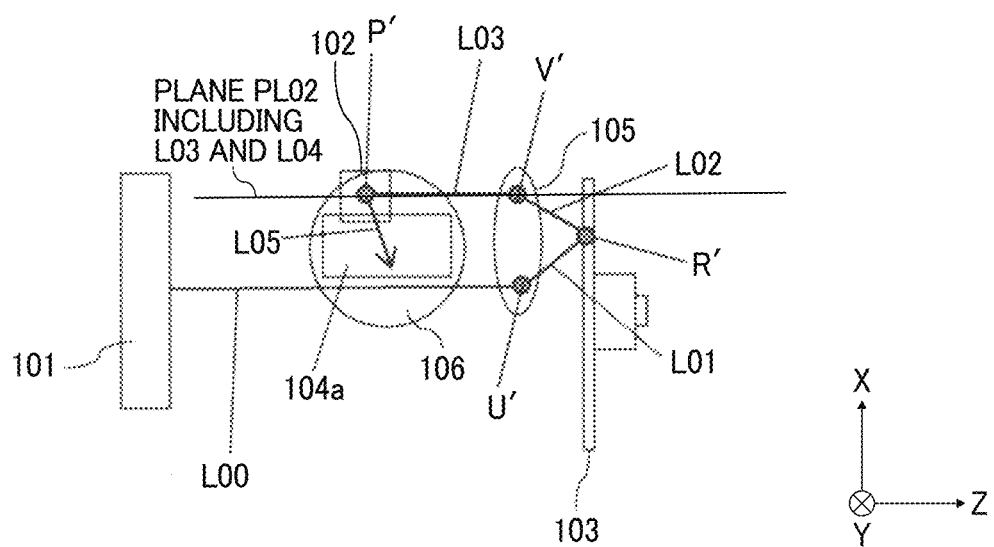

FIGS. 29A to 29C are schematic configuration diagrams illustrating a light-source device 100 according to a twelfth embodiment. The light-source device 100 according to the twelfth embodiment includes a characteristic configuration for providing the same effect as the effect of the ninth embodiment, for example, in the case of having the optical arrangement as in the fifth embodiment to the eighth embodiment. For this reason, the characteristics of the optical path of the light-source device 100 according to the twelfth embodiment are mainly described here. The detailed effect is common to the effect described in the ninth embodiment and therefore description is omitted as appropriate.

Reference codes illustrated in FIGS. 29A and 29B are described below. The definitions of the straight line and the light ray, which are common to the description of FIGS. 26A and 26B, are omitted. L00 denotes an optical path (straight line) that starts from a substantially central portion of a flux of light rays emitted from a light source 101 and connects the substantially central portion of the flux of light rays to the center of a projection image of an incident surface of a condenser lens 105 onto which the excitation light incident on the condenser lens 105 is projected. L01 is an optical path (straight line) connecting the center of a projection image of the excitation light emitted from the light source 101 on an exit surface of the condenser lens 105 and a center point R' of a projection image of the excitation light on a phosphor unit 103. L02 is an optical path (straight line) connecting the point R' and the center of a projection image of the excitation light reflected by the phosphor unit 103 on an incident surface of the condenser lens 105. L03 denotes an optical path (straight line) connecting the center of a projection image of the excitation light reflected by the phosphor unit 103 on an exit surface of the condenser lens 105 and a center point P' of a projection image of the excitation light on an optical element 102. L04 is an optical path (straight line) connecting the point P' and the center of a projection image of the excitation light on an incident surface of a refractive lens (refractive element) 106. L05 is an optical path (straight line) connecting the center of a projection image of the excitation light on an exit surface 106b of the refractive lens 106 and a center point T' of a projection image of the excitation light on an incident plane (incident aperture) 104a of a rod integrator 104. U' is an imaginary intersection of the straight line L00 and the straight line L01. V' is an imaginary intersection of the straight line L02 and the straight line L03. W' is an imaginary intersection of the straight line L04 and the straight line L05.

The light ray traveling along the straight line L00 is reflected by the refraction action of the condenser lens 105 and travels to the point R'. At this time, the point R' on the phosphor unit 103 is a reflection region, and specular reflection occurs at the point R'. The specularly reflected excitation light is refracted again by the refraction action of the condenser lens 105 and travels toward the point P' on the optical element 102. The excitation light reflected by the optical element 102 is directed to the point T' by the refraction action of the refractive lens 106.

In order to clarify the three-dimensional positional relationship, the direction of emission of the light source is defined as the Z-axis, and the X, Y and Z coordinate axes of the right-handed system are defined as illustrated in the FIGS. 29A and 29B. FIG. 29A is a diagram of the YZ plane viewed from the minus side of the X-axis. FIG. 29B is a diagram of the state of FIG. 29A viewed from the light source 101 side, in other words, a diagram of the YX plane viewed from the minus side of the Z-axis. FIG. 29C is a diagram viewed from the opposite side of the rod integrator 104, in other words, a diagram of the XZ plane in the state of FIG. 29A viewed from the minus side of the Y-axis.

The light-source device of the present embodiment is characterized in that a plane PL01 including a straight line L01 and a straight line L02 illustrated in FIG. 29B and a plane PL02 including a straight line L03 (a straight line perpendicular to the surface of the drawing sheet in which FIG. 29B is drawn) and a straight line L04 are "not parallel to each other". As illustrated in FIG. 29C, the longer side LE of the incident aperture 104a of the rod integrator 104 is parallel to the plane PL02.

With such a configuration, since the excitation light or the like can be incident so as to strike the inner side surface corresponding to the longer side LE of the incident aperture 104a of the rod integrator 104, the excitation light can be made uniform as the number of reflections of the excitation light or the like inside the rod integrator 104 increases, and the occurrence of color unevenness in the excitation light or the like can be restrained. Similarly with the tenth and eleventh embodiments, which are modifications of the ninth embodiment, in the twelfth embodiment, the rod integrator 104 is rotated (the longer side LE of the incident aperture 104a is slightly rotated clockwise or counterclockwise with respect to the plane PL02 by a small amount to be slightly shifted from the parallel arrangement). Thus, the effect can be further enhanced.

In the present embodiment, as illustrated in FIG. 29C, the longer side LE of the incident aperture 104a of the rod integrator 104 is substantially parallel to the plane PL02. On the other hand, as described in the first to fifth embodiments, in the case in which the longer side LE of the incident aperture 104a of the rod integrator 104 is substantially perpendicular to the plane PL02 (for example, the longer side LE of the incident aperture 104a of the rod integrator 104 is substantially perpendicular to the surface of the drawing sheet in which FIG. 29A is drawn), the excitation light can be incident on the inner side surface corresponding to the longer side LE of the incident aperture 104a of the rod integrator without three-dimensionally bending the optical path as in the twelfth embodiment (in other words, with the plane PL01 and the plane PL02 being substantially parallel). In other words, a feature of the present embodiment is to determine the way of turning the optical path and the like so that the excitation light is incident so as to strike the inner side surface corresponding to the longer side LE of the incident aperture 104a of the rod integrator 104.

While specific examples desirable for the present disclosure are described in the above-described embodiments; however, the disclosure is not limited to the contents. In particular, the specific shapes and numerical values of the respective components exemplified in the embodiments are merely examples for implementing the disclosure. The technical scope of the disclosure should not be limitedly interpreted thereby. The present disclosure is not limited to the contents described in the embodiments, and may be properly modified within the scope of the disclosure.

The invention claimed is:
1. A light-source device comprising:
an excitation light source to emit first color light; and
a light mixing structure including a rod integrator to mix the first color light;
wherein an angle formed by a projection straight line of the first color light incident on an incident aperture of the rod integrator and a predetermined axial line of the incident aperture of the rod integrator is smaller than 40°, the predetermined axial line of the incident aperture is a shorter side of the incident aperture, and the angle is defined in a plane including a longer side and the shorter side of the incident aperture of the rod integrator.
2. The light-source device according to claim 1, further comprising:
a wavelength converter including a wavelength converting structure to receive the first color light, convert at least some of the first color light into second color light having a wavelength different from a wavelength of the first color light, and emit the second color light;
an optical structure disposed on an optical path of the first color light and having a reflecting surface to reflect the first color light; and
a large-diameter lens and a collimating structure on an optical path between the excitation light source and the optical structure,
the large-diameter lens having a positive power in a direction of travel of the first color light,
the collimating structure having a negative power in the direction of travel of the first color light,
wherein the rod integrator is further configured to mix the second color light,
wherein a center of the first color light on the reflecting surface of the optical structure intersects with only one of a first light flux of the first color light incident on the wavelength converter and a second light flux of the first color light emitted from the wavelength converter, and
wherein the first color light emitted from the excitation light source is condensed by the large-diameter lens, is substantially collimated by the collimating structure, and is incident on the optical structure.
3. The light-source device according to claim 2, further comprising:
a light guide to guide the at least one of the first color light and the second color light emitted from the wavelength converter to the light mixing structure; and
a refractive optical structure to guide the at least one of the first color light and the second color light emitted from the wavelength converter to the incident aperture of the rod integrator,
wherein the center of the first color light on the reflecting surface of the optical structure intersects with only the first light flux and does not intersect with the second light flux.
4. The light-source device according to claim 1,
wherein the incident aperture of the rod integrator has a shape including a longer side and a shorter side shorter than the longer side, and
wherein the predetermined axial line coincides with a direction of the shorter side of the incident aperture of the rod integrator.
5. The light-source device according to claim 2,
wherein the wavelength converter includes:
a first region to reflect or diffusely reflect the first color light incident on the wavelength converter; and
a second region provided with the wavelength converting structure to convert the first color light reflected by the optical structure to emit the second color light,
wherein the wavelength converter sequentially switches and emits the first color light and the second color light to an incident plane side of the first color light when the first color light is incident on the wavelength converter.
6. The light-source device according to claim 2,
wherein the wavelength converter provided with the wavelength converting structure in a region on which the first color light incident on the wavelength converter is incident,
wherein the wavelength converting structure converts some of the first color light incident on the region into the second color light and reflects some of the first color light reflected by the optical structure, and
wherein the wavelength converting structure emits the first color light and the second color light together to an incident plane side of the first color light when the first color light is incident on the wavelength converter.

7. The light-source device according to claim 1,
wherein an angle formed by the first color light incident on the rod integrator and the incident aperture of the rod integrator is smaller than 40°.

8. The light-source device according to claim 1,
wherein the light mixing structure is disposed on a perpendicular line of another point on an exit plane of the wavelength converter, and
wherein said another point is a center of a projection image of the first color light projected on the wavelength converter.

9. The light-source device according to claim 2, further comprising a condensing structure disposed on an optical path between the optical structure and the wavelength converter to condense the first color light reflected by the optical structure and substantially collimate the second color light emitted from the wavelength converter,
wherein a center of a projection image of the first color light projected on the wavelength converter is different in position from a point of intersection,
the point of intersection is a point at which a straight line intersects with an incident plane of the first color light that is condensed by the condensing structure and incident on the wavelength converter,
the straight line is a line connecting the center of the first color light on the reflecting surface of the optical structure and a center of a projection image on an incident plane of the condensing structure onto which the first color light incident on the condensing structure after being reflected by the reflecting surface is projected.

10. The light-source device according to claim 3,
wherein a center of a projection image of the first color light projected on the incident aperture of the rod integrator, a center of a projection image of the second color light projected on the incident aperture of the rod integrator, and an optical axis of the refractive optical structure intersect at one point.

11. The light-source device according to claim 2, further comprising a condensing structure disposed on an optical path between the optical structure and the wavelength converter to condense the first color light reflected by the optical structure and collimate the second color light emitted from the wavelength converter,
wherein a plane including a first straight line and a second straight line is substantially parallel with the predetermined axial line of the incident aperture of the rod integrator,
the first straight line is a line connecting the center of the first color light on the reflecting surface of the optical structure and a center of a projection image on an incident plane of the condensing structure onto which the first color light incident on the condensing structure after being reflected by the reflecting surface is projected, and
the second straight line is a line connecting a center of a projection image of the first color light projected on the wavelength converter and a center of a projection image on the incident aperture of the rod integrator on which the first color light is projected.

12. The light-source device according to claim 2, further comprising a condensing structure disposed on an optical path between the optical structure and the wavelength converter to condense the first color light reflected by the optical structure and collimate the second color light emitted from the wavelength converter,
wherein a plane including a first straight line and a second straight line is substantially parallel with a predetermined axial line of a light-emitting surface of the excitation light source,
the first straight line is a line connecting the center of the first color light on the reflecting surface of the optical structure and a center of a projection image on an incident plane of the condensing structure onto which the first color light incident on the condensing structure after being reflected by the reflecting surface is projected, and
the second straight line is a line connecting a center of a projection image of the first color light projected on the wavelength converter and a center of a projection image on the incident aperture of the rod integrator on which the first color light is projected.

13. The light-source device according to claim 2,
wherein $\theta_1$ is smaller than $\theta_2$, where $\theta_1$ is an incident angle of a light ray of the first color light incident on the incident aperture of the rod integrator at a largest angle, and $\theta_2$ is an incident angle of a light ray of the second color light incident on the incident aperture of the rod integrator at a largest angle.

14. The light-source device according to claim 2,
wherein $\theta_1$ is equal to $\theta_2$, where $\theta_1$ is an incident angle of a light ray of the first color light incident on the incident aperture of the rod integrator at a largest angle, and $\theta_2$ is an incident angle of a light ray of the second color light incident on the incident aperture of the rod integrator at a largest angle.

15. The light-source device according to claim 1,
wherein the incident aperture of the rod integrator is smaller than an exit aperture of the rod integrator.

16. The light-source device according to claim 2,
wherein the rod integrator includes a glass rod integrator, and $\theta_{glass}$ is larger than $\theta_1$ and $\theta_2$,
where $\theta_1$ is an incident angle of a light ray of the first color light incident on the incident aperture of the rod integrator at a largest angle,
$\theta_2$ is an incident angle of a light ray of the second color light incident on the incident aperture of the rod integrator at a largest angle, and
$\theta_{glass}$ is a total reflection condition of the glass rod integrator.

17. The light-source device according to claim 1,
wherein the excitation light source includes a plurality of laser diodes arrayed,
a projection area on the incident aperture of the rod integrator onto which the first color light emitted from each of the plurality of laser diodes is projected has an elliptical shape, and a major axis of the elliptical shape is substantially parallel to a longer side or a shorter side of the incident aperture of the rod integrator.

18. The light-source device according to claim 17,
wherein the plurality of laser diodes are arranged on a same substrate.

19. The light-source device according to claim 1,
wherein the excitation light source includes:
a plurality of laser diodes arranged in rows and columns; and
a light source including a plurality of coupling lenses on an exit plane side of the laser diodes, and
wherein an arrangement interval of the laser diodes satisfies a relation of $1 \leq p/L \tan \theta \leq 4$
where $\theta$ is a larger one of a divergence angle in a row direction and a divergence angle in a column direction of the first color light emitted from the laser diodes, p is a pitch of adjacent ones of the laser diodes, and L is a distance from a light-emitting point of each of the laser diodes to a corresponding one of the coupling lenses.

20. An image projection apparatus, comprising:
the light-source device according to claim 1;
an illumination optical structure to guide light emitted from the light source device to an image display; and
a projection optical structure to project an image formed by the image display, with the light guided by the illumination optical structure.

* * * * *